(12) United States Patent
Murray et al.

(10) Patent No.: US 12,381,499 B2
(45) Date of Patent: Aug. 5, 2025

(54) AUTOMATED LOAD TORQUE RIPPLE COMPENSATION USING FEEDFORWARD SIGNALS CALCULATED USING A CROSS-CORRELATION FUNCTION

(71) Applicant: Infineon Technologies Austria AG, Villach (AT)

(72) Inventors: Brendan Murray, Los Angeles, CA (US); Lei Han, Los Angeles, CA (US)

(73) Assignee: Infineon Technologies Austria AG, Villach (AT)

( * ) Notice: Subject to any disclaimer, the term of this patent is extended or adjusted under 35 U.S.C. 154(b) by 145 days.

(21) Appl. No.: 18/458,669

(22) Filed: Aug. 30, 2023

(65) Prior Publication Data

US 2025/0080021 A1 Mar. 6, 2025

(51) Int. Cl.
 *H02K 29/06* (2006.01)
 *H02P 6/10* (2006.01)
 *H02P 21/20* (2016.01)
 *H02P 21/22* (2016.01)
 *H02P 27/08* (2006.01)

(52) U.S. Cl.
 CPC .............. *H02P 21/20* (2016.02); *H02P 21/22* (2016.02); *H02P 27/08* (2013.01)

(58) Field of Classification Search
 CPC ........... H02P 21/20; H02P 21/22; H02P 27/08
 USPC .................................................... 318/400.23
 See application file for complete search history.

(56) References Cited

U.S. PATENT DOCUMENTS

| | | | | |
|---|---|---|---|---|
| 1,083,902 | A * | 1/1914 | Schubert | G01L 7/04 73/740 |
| 9,998,053 | B2 * | 6/2018 | Miklosovic | H02P 23/14 |
| 2004/0236492 | A1 * | 11/2004 | Yasui | F02D 41/1402 123/399 |
| 2007/0186691 | A1 * | 8/2007 | Morishita | G01P 3/46 73/862.326 |
| 2017/0025979 | A1 * | 1/2017 | Wilson | H02P 6/10 |
| 2024/0217348 | A1 * | 7/2024 | Sarigiannidis | B60L 15/24 |

* cited by examiner

*Primary Examiner* — Erick D Glass
(74) *Attorney, Agent, or Firm* — Harrity & Harrity, LLP

(57) ABSTRACT

A motor controller includes a measurement interface configured to measure a mechanical angle of a shaft driven by a motor and a rotational speed of the shaft, and generate a speed feedback signal representative of the rotational speed, a speed regulator, and a current regulator. The speed regulator includes an error component configured to generate a speed error signal based on a difference between a speed reference signal and the speed feedback signal; a proportional integral controller configured to, based on the speed error signal, regulate a torque reference value that is configured to sustain a speed reference value; and a load torque ripple compensator configured to apply a torque feedforward function to reduce a load torque ripple in the torque reference value. The current regulator is configured to drive motor currents of the motor for generating a torque corresponding to the torque reference value.

23 Claims, 8 Drawing Sheets

AUTOMATED LOAD TORQUE RIPPLE COMPENSATION USING FEEDFORWARD SIGNALS CALCULATED USING A CROSS-CORRELATION FUNCTION

BACKGROUND

Motor drives use switching power inverters to generate variable frequency AC voltages to control the speed of AC motors in domestic, commercial, and industrial applications. Permanent magnet alternating current (PMAC) motors generally provide higher power to weight and efficiency than induction motors and are widely used in applications that demand a high dynamic response and/or a very high system efficiency. Stable operation of PMAC motors requires the magnitude and frequency of the applied voltages be scaled and synchronized with the motor rotational frequency.

Usually, a power inverter is composed of two complementary transistors (e.g., a high-side transistor and a low-side transistor) for each motor phase, where the two complementary transistors form a half-bridge to drive an output pad connected to a motor winding. A gate driver, used for driving the two complementary transistors, may be supplied with a fixed positive voltage by a positive supply rail and a fixed negative voltage by a negative supply rail. The positive supply rail may be connected to the output pad via the high-side transistor of the two complementary transistors to supply load current to the motor winding, and the negative supply rail may be connected to the output pad via the low-side transistor of the two complementary transistors to sink load current from the motor winding. The two complementary transistors may be complementarily turned on and off to avoid cross-conduction.

Accordingly, the load current, also referred to as a motor phase current, may be controlled by driving the two complementary transistors. The amplitude of the control signal received from the gate driver for each transistor may be varied to drive the two complementary transistors between switching states. This, in turn, drives the motor. For example, a gate-source voltage Vgs of a metal oxide semiconductor field effect transistor (MOSFET) is typically driven down to approximately zero to turn off the MOSFET and is typically driven to a maximum value to fully turn on the MOSFET. For this reason, the gate-source voltage Vgs may be referred to as a control voltage.

During a running operation, a motor may be driven according to a motor control algorithm to achieve a desired motor speed corresponding to a pulse width of the control signals. The motor may drive a load, for example, by driving a shaft that is coupled to the load. Some types of loads may vary non-linearly with a change in a mechanical angle of the shaft. For example, the motor may be configured to drive a compressor or a pump, during which a load torque varies as a non-linear function of the mechanical angle of the shaft. As a result, a load torque ripple with an unknown magnitude and phase is produced. For example, a compressor has an alternating current (AC) load torque ripple component due to a piston action with a fundamental frequency at a motor rotational frequency. Thus, while the fundamental frequency of the AC load torque ripple component can be derived from the motor rotational frequency, the magnitude and phase of the AC load torque ripple component remain unknown. However, in order to reduce or suppress the AC load torque ripple component for improved motor control, the magnitude and phase of the AC load torque ripple component need to be accurately determined.

SUMMARY

In some implementations, a motor controller configured to drive a motor coupled to a shaft includes a measurement interface configured to measure a mechanical angle of the shaft and a rotational speed of the shaft, and generate a speed feedback signal representative of the rotational speed; a speed regulator comprising: a first error component configured to receive a speed reference signal corresponding to a speed reference value and the speed feedback signal, and generate a speed error signal based on a difference between the speed reference signal and the speed feedback signal; a proportional integral (PI) controller configured to, based on the speed error signal, regulate a torque reference value that is configured to sustain the speed reference value; and a load torque ripple compensator configured to apply a torque feedforward function to reduce a load torque ripple in the torque reference value, wherein applying the torque feedforward function includes generating a feedforward compensation signal that matches a frequency, a magnitude, and a phase of the load torque ripple, and adding the feedforward compensation signal to an output signal of the PI controller to generate the torque reference value, wherein the load torque ripple varies with the mechanical angle, and wherein the load torque ripple compensator is configured to dynamically adjust a magnitude and a phase of the feedforward compensation signal in real time as a load of the motor varies over time; and a current regulator configured to receive the torque reference value and drive motor currents of the motor for generating a torque corresponding to the torque reference value.

In some implementations, a method of reducing load torque ripple associated with driving a motor coupled to a shaft includes measuring a mechanical angle of the shaft; measuring a rotational speed of the shaft; generating a speed feedback signal representative of the rotational speed; generate a speed error signal based on a difference between a speed reference signal and the speed feedback signal; regulating, by a PI controller based on the speed error signal, a torque reference value that is configured to sustain a speed reference value of the speed reference signal; applying a torque feedforward function to reduce a load torque ripple in the torque reference value, including generating a feedforward compensation signal that matches a frequency, a magnitude, and a phase of the load torque ripple, and adding the feedforward compensation signal to an output signal of the PI controller to generate the torque reference value, wherein the load torque ripple varies with the mechanical angle; dynamically adjusting a magnitude and a phase of the feedforward compensation signal in real time as a load of the motor varies over time; and driving motor currents of the motor for generating a torque corresponding to the torque reference value.

BRIEF DESCRIPTION OF THE DRAWINGS

Implementations are described herein making reference to the appended drawings.

DETAILED DESCRIPTION

Figure 1:
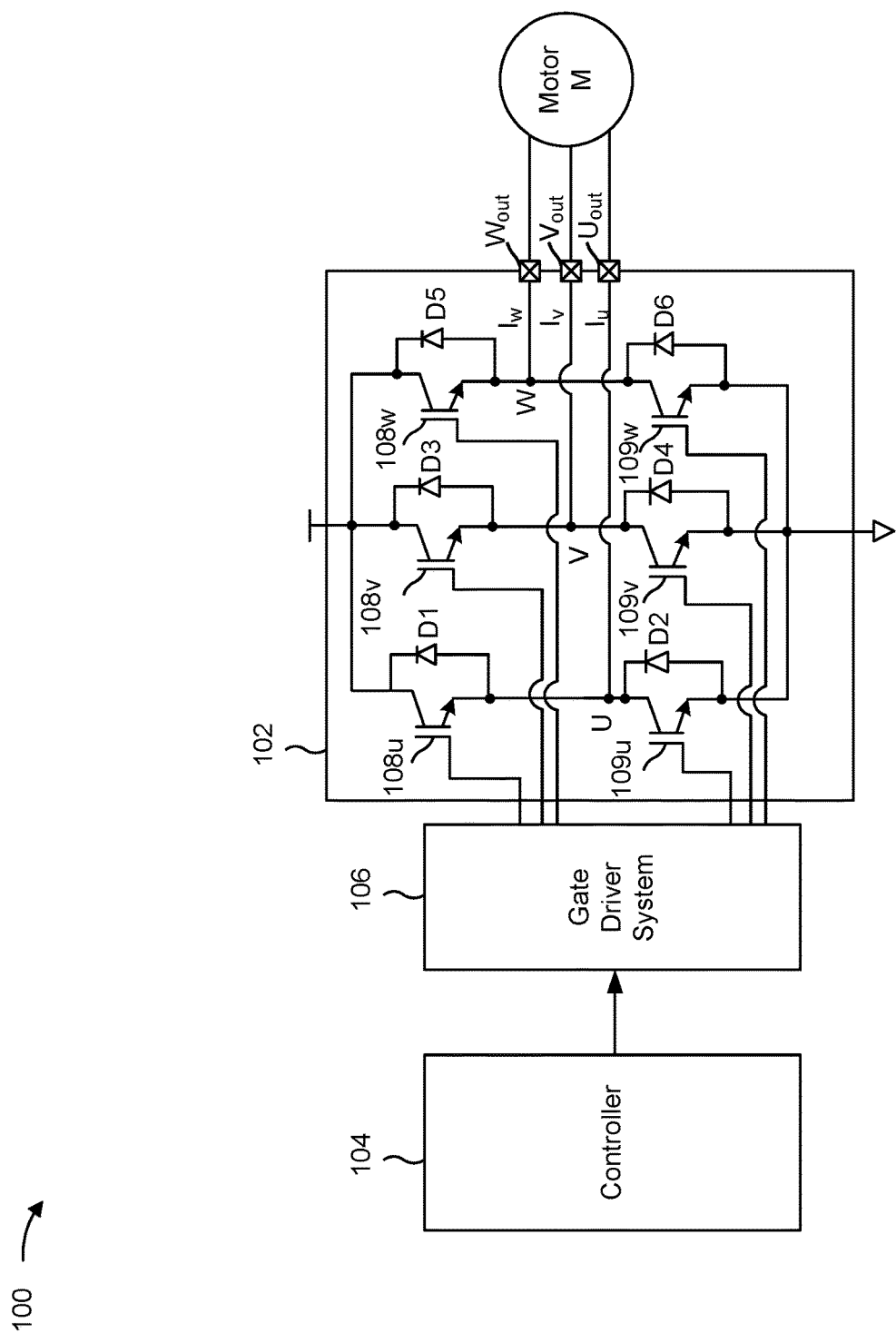
FIG. 1 illustrates a schematic block diagram illustrating a motor control system according to one or more implementations.

In the following, details are set forth to provide a more thorough explanation of example implementations. However, it will be apparent to those skilled in the art that these implementations may be practiced without these specific details. In other instances, well-known structures and devices are shown in block diagram form or in a schematic view, rather than in detail, in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually interchangeable.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling (e.g., any connection or coupling without additional intervening elements) may also be implemented by an indirect connection or coupling (e.g., a connection or coupling with one or more additional intervening elements, or vice versa) as long as the general purpose of the connection or coupling (e.g., to transmit a certain kind of signal or to transmit a certain kind of information) is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, a signal with an approximate signal value may practically have a signal value within 5% of the approximate signal value.

In the present disclosure, expressions including ordinal numbers, such as "first", "second", and/or the like, may modify various elements. However, such elements are not limited by such expressions. For example, such expressions do not limit the sequence and/or importance of the elements. Instead, such expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A transistor can be referred to as a power switch or a transistor switch that may be used to drive a current, such as a load current. Transistors may include insulated gate bipolar transistors (IGBTs) and MOSFETs (e.g., Si MOSFETs or SiC MOSFETs), among other examples. It will be appreciated that one type of transistor may be substituted for another type of transistor.

Some implementations described in this disclosure pertain to, without being limited thereto, half-bridges used for driving electric motors. For example, a multi-phase inverter, as a type of power inverter, is configured to provide multi-phase power by supplying multiple phase loads (e.g., a three-phase motor). For instance, three-phase power involves three symmetrical sine waves that are 120 electrical degrees out of phase with one another. In a symmetric three-phase power supply system, three conductors each carry an alternating current (AC) of the same frequency and voltage amplitude relative to a common reference but with a phase difference of one third of a driving cycle. Due to the phase difference, a voltage on any of the three conductors may reach its voltage peak at one third of the driving cycle, with the voltage peaks of the three conductors being distributed from each other within the driving cycle with a substantially equal phase delay. This phase delay makes it possible to produce a rotating magnetic field in an electric motor.

A three-phase inverter includes three inverter legs, one for each of the three phases, and each inverter leg is connected to a direct current (DC) voltage source in parallel to each other. Each inverter leg includes a pair of transistors arranged in a half-bridge configuration for converting DC to AC, for driving a phase load.

A motor speed signal used by a motor controller for feedback control of the motor has an AC error component resulting from a net shaft ripple torque filtered by a non-linear load, such as a compressor load. An integrator in a proportional integral (PI) controller of the motor controller is intended to drive a torque reference value until an average motor speed error is zero. However, the PI controller cannot track a per cycle AC component of a load torque ripple (e.g., an AC compressor ripple component) because a gain of the PI controller varies with frequency. At high motor speeds, a mechanical filtering provided by the compressor load inertia reduces a ripple in the motor speed signal to an acceptable level. However, there is a range of operating speeds where a ripple in the motor speed signal causes noticeable shaft vibrations and acoustic noise. This ripple in the motor speed signal may be referred to a "load torque ripple" that represents the AC error component found in the motor speed signal that is caused by a non-linear load.

For example, the motor may drive the non-linear load, for example, by driving a shaft that is coupled to the non-linear load. Some types of loads may vary non-linearly with a change in a mechanical angle of the shaft. A load torque may vary as a non-linear function of the mechanical angle of the shaft. As a result, the load torque ripple with an unknown magnitude and phase is produced. However, in order to reduce or even suppress the AC load torque ripple component for improved motor control, the magnitude and phase of the AC load torque ripple component need to be accurately determined.

In most applications, it is not possible to use a shaft torque sensor to measure the load torque ripple in order to reduce this AC error component. Moreover, some solutions include using feedforward functions that require manual determination of compensation parameters by trial and error during system commissioning and parameter tables to be selected according to an operating point and/or according to an application configuration.

Some implementations disclosed herein are directed to a motor controller that uses a feedforward compensation algorithm that automatically determines the magnitude and the phase of the load torque ripple and dynamically adjusts a feedforward compensation in real-time as the load varies with changing environmental conditions. For example, the feedforward compensation algorithm may reduce or eliminate the load torque ripple at medium to high speeds when a ripple frequency of the load torque ripple is close to or greater than a bandwidth of a speed controller of the motor controller. The motor controller may use the feedforward compensation algorithm to automatically determine AC components of a motor load torque and generate a feedforward compensation signal to eliminate mechanical vibrations by suppressing the load torque ripple. The motor controller may determine a frequency of the feedforward compensation signal may from the motor rotational frequency. Additionally, the motor controller may determine a magnitude and a phase of the load torque ripple, and match a magnitude and a phase of the feedforward compensation signal to the magnitude and the phase of the load torque ripple in order to reduce or otherwise suppress the load torque ripple. The motor controller may adjust the frequency, magnitude, and phase of the feedforward compensation signal in real-time to match the load torque ripple, which may change as a non-linear function of the mechanical angle of the shaft.

In some implementations, the motor controller may use a cross-correlation function to measure a direct component and a quadrature component of a fundamental harmonic (e.g., a first harmonic component) of an output signal of a PI controller arranged in a motor speed control loop. The motor controller may acquire two sequential measurements at two different trial levels of feedforward torque. The motor controller may calculate the magnitude and the phase of the feedforward compensation signal from a linear combination of the two sequential measurements.

Accordingly, the motor controller may provide a more reliable operation and improved runtime efficiencies of systems, such as heating, ventilation, and air conditioning (HVAC) compressors and refrigeration compressors, by minimizing mechanical vibrations for all operating conditions over a lifetime of a product. In addition, the feedforward compensation algorithm may realize cost savings by eliminating multiple manual steps during a manufacturing and a commissioning of these systems.

FIG. 1 illustrates a schematic block diagram illustrating a motor control system 100 according to one or more implementations. In particular, the motor control system 100 includes a power inverter 102, a controller 104, and a gate driver system 106. The controller 104 and the gate driver system 106 may operate together as a motor control unit (e.g., a motor controller). In some implementations, the motor control unit may be a monolithic integrated circuit (IC) with the controller 104 and the gate driver system 106 being arranged on a single IC. "Monolithic" refers to a type of IC or semiconductor device that is fabricated on a single chip of a single material, typically silicon. The IC is called "monolithic" because all the active and passive components of the circuit, such as transistors, resistors, capacitors, and interconnects, are integrated onto a single piece or substrate of material. In some implementations, the motor control unit may be divided into two or more ICs, for example, with the controller 104 being arranged on a first IC and the gate driver system 106 being arranged on one or more second ICs. Thus, the gate driver system 106 may be a monolithic gate driver. It will be appreciated that, while implementations described herein are directed to driving a motor, the concepts described herein may be extended to other types of inductive loads and are not limited to motors.

The motor control system 100 is further coupled to a motor M (e.g., a permanent magnet synchronous motor (PMSM) as a type of AC motor), that includes three phases U, V, and W. The power inverter 102 in this example is a three-phase voltage generator configured to provide three-phase power by supplying three phase voltages to drive the motor M.

Deviations in both magnitude and phase may cause a loss in power and torque in the motor M. Therefore, the controller 104 may be configured to monitor and control the magnitude and phase of the voltages supplied to the motor M in real-time to ensure that the proper current balance is maintained based on a feedback control loop.

The power inverter 102 for the motor M includes a switching array of six transistors 108u, 108v, 108w, 109u, 109v, and 109w arranged in complementary pairs. Each complementary pair forms a half-bridge circuit and constitutes one inverter leg that supplies a phase voltage to the motor M. Thus, each inverter leg includes a high-side transistor 108u, 108v, or 108w and a low-side transistor 109u, 109v, or 109w. Additionally, each transistor 108u, 108v, 108w, 109u, 109v, and 109w may be connected antiparallel to a corresponding freewheeling diode D1-D6. The freewheeling diodes D1-D6 provide an alternative current path for the load current after turn off of a respective transistor 108u, 108v, 108w, 109u, 109v, and 109w for current commutation. For example, the freewheeling diode D1 provides an alternative current path with respect to the low-side transistor 109u during the turn off of the low-side transistor 109u. Similarly, the freewheeling diode D2 provides an alternative current path with respect to the high-side transistor 108u during the turn off of the high-side transistor 108u.

Load current paths U, V, and W extend from an output pad Uout, Vout, or Wout of each inverter leg (e.g., the output of each half-bridge circuit) located between complementary transistors and are configured to be coupled to a load, such as the motor M. Each load current path U, V, and W carries a corresponding phase current Iu, Iv, and Iw. Each phase current Iu, Iv, and Iw has an AC electrical frequency that directly corresponds to the actual motor speed of the motor M.

The power inverter 102 is coupled to a DC power supply (e.g., a battery or a diode bridge rectifier) and to the gate driver system 106.

The controller 104, which may be a microcontroller or another hardware-based controller, performs a motor control function of the motor control system 100 in real-time (or near real-time) and transmits pulse width modulation (PWM) control signals to a gate driver system 106. The controller 104 may employ a PWM scheme for controlling the state of each transistor, and, ultimately, each phase current provided on the respective load current paths U, V, and W. The gate driver system 106 generates driver signals based on the PWM control signals for controlling the switching states (e.g., on and off states) of the transistors 108u, 108v, 108w, 109u, 109v, and 109w. Thus, load current paths U, V, and W may be controlled by the controller 104 and the gate driver system 106 by controlling the control electrodes (e.g., gate electrodes) of the transistors 108u, 108v, 108w, 109u, 109v, and 109w. For example, upon receiving a PWM control signal from the controller 104, the gate driver system 106 may set a corresponding transistor 108u, 108v, 108w, 109u, 109v, or 109w in one of a conducting state (e.g., on-state) or a blocking state (e.g., off-state).

The gate driver system 106 may include one or more gate drivers for driving the transistors 108u, 108v, 108w, 109u, 109v, and 109w between switching states. For example, the gate driver system 106 may include a gate driver for each half-bridge circuit. The gate driver system 106 may be configured to receive instructions, including the PWM control signals, from the controller 104, and respectively turn on and turn off the transistors 108u, 108v, 108w, 109u, 109v, and 109w in accordance with the received instructions and the control signals. For example, during the turn-on process of a transistor 108u, 108v, 108w, 109u, 109v, or 109w, the gate driver system 106 may be used to provide (source) a gate current to a gate of the transistor 108u, 108v, 108w, 109u, 109v, or 109w to charge the gate. In contrast, during the turn-off process, the gate driver system 106 may be used to draw (sink) a gate current from the gate of the transistor 108u, 108v, 108w, 109u, 109v, or 109w to discharge the gate.

Furthermore, the transistors 108u, 108v, 108w, 109u, 109v, and 109w of the power inverter 102 are controlled so that at no time are both high-side and low-side transistors in the same inverter leg turned on, or else the DC power supply would be shorted. This requirement may be met by the complementary operation of the transistors 108u, 108v, 108w, 109u, 109v, and 109w within an inverter leg according to a motor control algorithm. For example, during operation, the motor M may be driven according to the motor control algorithm to achieve a desired motor speed corresponding to an electrical frequency of the control signals. A dead time may be imposed by the controller 104 during which both the high-side and low-side transistors of the same inverter leg are simultaneously turned off.

The controller 104 may include a PWM controller, an analog-to-digital converter (ADC), a digital signal processor (DSP), and/or a clock source (i.e., a timer or counter) used in implementing a PWM scheme for controlling the states of each transistor 108u, 108v, 108w, 109u, 109v, and 109w, and, ultimately, each phase current provided on the respective load current paths U, V, and W.

In particular, the controller 104 may use a motor control algorithm, such as a field oriented control (FOC) algorithm, for providing current control in real-time for each phase current output to a multi-phase load, such a multi-phase motor. Thus, a field-oriented control loop may be referred to as a current control loop. Motor speed may further be controlled by adding a speed constant control loop on top of FOC that provides speed constant control. Thus, FOC (i.e., the current control loop) may be considered as an inner control loop and a speed constant control loop may be considered as an outer control loop.

As indicated above, FIG. 1 is provided merely as an example. Other examples may differ from what is described with regard to FIG. 1. For example, in some implementations, a number of motor phases may be different or two half-bridges may be connected as an H-bridge circuit. In some implementations, additional circuit components may be added without deviating from the disclosure provided above.

Figure 2:
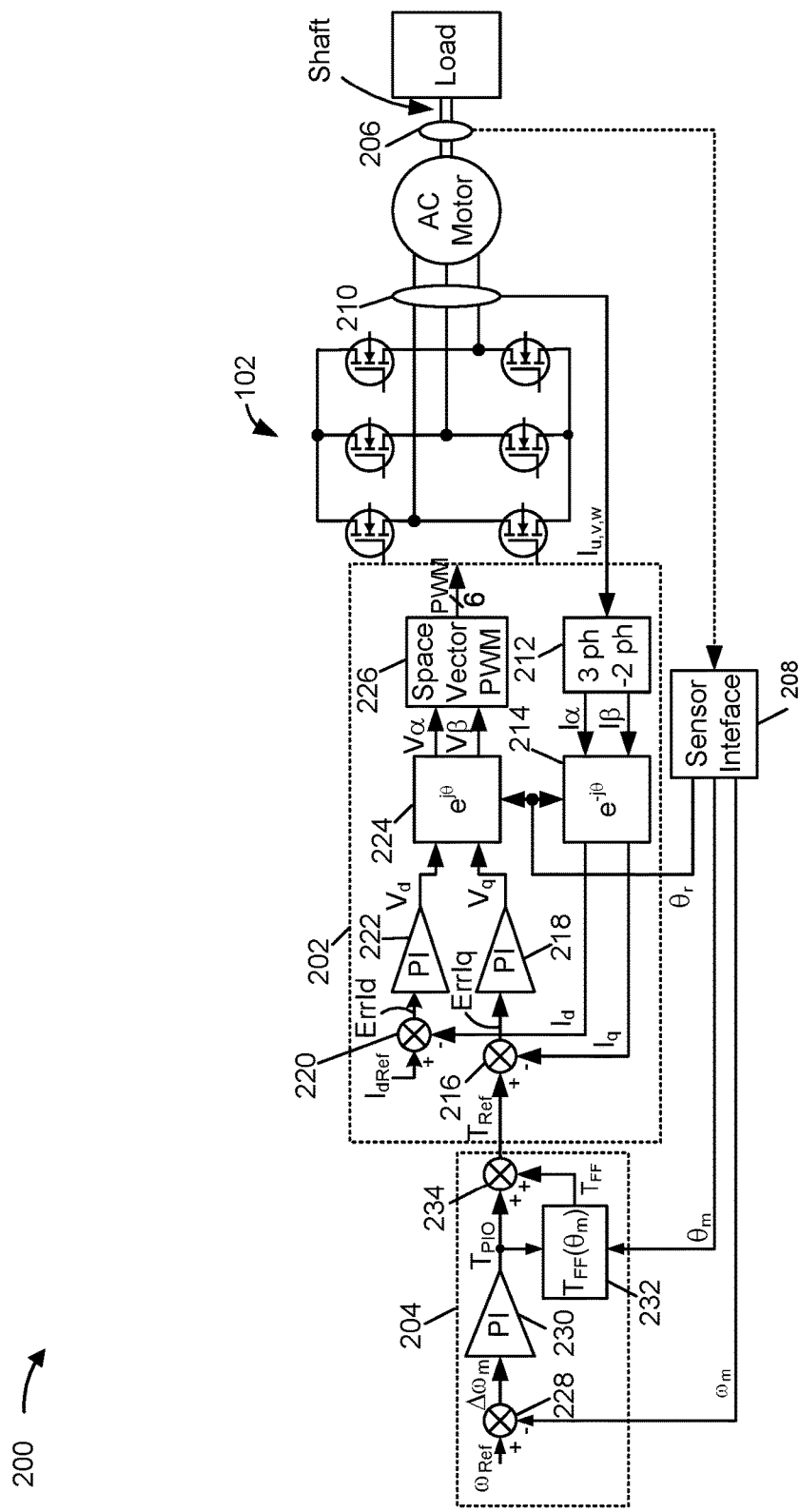
FIG. 2 illustrates a schematic block diagram illustrating a motor control system according to one or more implementations.

FIG. 2 illustrates a schematic block diagram illustrating a motor control system 200 according to one or more implementations. Motor control algorithms described herein can be implemented either as software on a programmable motor controller, or as hardware on a configurable control circuit or a hard-coded control circuit. The configurable control circuit may be a digital or a mixed signal control circuit. Likewise, the hard-coded control circuit may be a digital or a mixed signal control circuit. For example, a motor control algorithm may be implemented as firmware programmed into the controller 104 or by a combination of firmware and circuit components (hardware) of the controller 104.

The motor control system 200 includes a current regulator 202 (e.g., a FOC-based current regulator) and a speed regulator 204. The current regulator 202 and the speed regulator 204 may be implemented as part of the controller 104.

As used herein, Vq and Vd represent the stator Q and D axis voltages of the motor in a DQ coordinate system, respectively. That is, Vq is the motor voltage component on the Q-axis of the DQ coordinate system, and Vd is the motor voltage component on the D-axis of the DQ coordinate system. Similarly, Iq and Id represent the stator Q and D axis currents of the motor in the DQ coordinate system, respectively. That is, Iq is the motor current component on the Q-axis of the DQ coordinate system and Id is the motor current component on the D-axis of the DQ coordinate system. Furthermore, each PI controller receives a proportional gain KP and an integral gain KI and generates an output according to equations, Eq. 1 and Eq. 2:

$$PI\ output = KP\Delta + KI \int \Delta dt, \qquad \text{Eq. 1}$$

where $\Delta$ is the error or deviation of an actual measured value (PV) from a setpoint (SP).

$$\Delta = SP - PV. \qquad \text{Eq. 2}$$

e current regulator 202 an the speed regulator 204 each play a role at varying motor windings voltages of an AC motor to drive the AC motor at a reference speed value (e.g., a target speed) provided by a speed reference signal $\omega_{Ref}$. A sensor-based or sensorless FOC algorithm structure may be used. In the example of FIG. 2, a sensor-based FOC algorithm structure is shown. For example, the AC motor may be coupled to a load via a shaft, and a shaft angle sensor 206 may be configured to sense a shaft angle (e.g., a rotational angle) of the shaft as the shaft rotates. An angle sensor interface 208, implemented as an example measurement interface, includes a processor that processes a sensor signal generated by the shaft angle sensor 206. From the sensor signal, the angle sensor interface 208 may generate a speed feedback signal ωm representative of a motor speed of the AC motor (e.g., a rotational speed of the shaft), a mechanical angle θm of the load (e.g., a mechanical angle of the shaft), and a rotor angle θr (e.g., a rotor magnetic field angle) of the motor. The speed feedback signal ωm includes an AC error component corresponding to the load torque ripple that is a target for compensation.

Additionally, current sensors 210 may be placed along the load current paths U, V, and W for measuring the phase currents (e.g., load currents), respectively, and provide three sensor signals Iu,v,w to a three-phase to two-phase converter 212, such as a Clarke transformation unit. The current sensors 210 may include Hall sensors or shunt resistors that are used to directly measure the phase currents. The three-phase to two-phase converter 212 may use a Clarke transform to apply an alpha-beta transformation on the three sensor signals Iu,v,w to derive an alpha current Iα and a beta current Iβ. The FOC further uses a vector rotation (e.g., a cordic rotation) at a vector rotation unit 214 to transform motor winding currents using alpha and beta currents Iα and Iβ into two quasi-DC current components, including a d-axis current Id that reinforces or weakens a rotor field and a q-axis current Iq that generates motor torque. The vector rotation of the vector rotation unit 214 may be driven by the rotor angle θr determined by the angle sensor interface 208 so that the d-axis current Id and the q-axis current Iq represent a rotor field component and a torque component of the motor current, respectively.

A q-axis summing junction 216 and PI compensator 218 (e.g., a PI controller) regulate the q-axis voltage Vq in a rotating reference frame such that the q-axis current Iq tracks a torque reference value $T_{Ref}$ output from the speed regulator 204. For example, the q-axis summing junction 216 may be an error generator, such as a subtractor, that receives the torque reference value $T_{Ref}$ as a setpoint (SP) value and the q-axis current Iq from the vector rotation unit 214 as an actual measured value (PV), and generates an error value ErrIq. The PI compensator 218 regulates the q-axis voltage Vq based on the error value ErrIq.

A d-axis summing junction 220 and a PI compensator 222 (e.g., a PI controller) regulate the d-axis voltage Vd in the rotating reference frame so the d-axis current Id follows a d-axis current reference IdRef to maximize motor efficiency. For example, the d-axis summing junction 220 may be an error generator, such as a subtractor, that receives the d-axis current reference IdRef as a setpoint (SP) value and the d-axis current Id from the vector rotation unit 214 as an actual measured value (PV), and generates an error value ErrId. The PI compensator 222 regulates the d-axis voltage Vd based on the error value ErrId.

A forward vector rotation unit 224 applies a forward vector rotation to the q-axis voltage Vq and the d-axis voltage Vd, and transforms the q-axis voltage Vq and the d-axis voltage Vd into two phase AC voltage components Vα and Vβ based on the rotor angle θr calculated by the angle sensor interface 208. Thus, the forward vector rotation unit 224 transforms the d-axis voltage Vd and the q-axis voltage Vq into the two phase AC voltage signals Vα and Vβ in a stator reference frame that drive a space vector PWM modulator 226 so that the three phase motor voltages drive a target motor field and torque components.

The space vector PWM modulator 226 receives the two phase AC voltage components Vα and Vβ and generates the inverter switching signals (e.g., six paths of PWM control signals output from controller 104) based on the Vα and Vβ voltage inputs and space vector pulse width modulation (SVPWM). The gate driver system 106 then turns on/off the respective power transistors 108u, 108v, 108w, 109u, 109v, and 109w based on the PWM control signals. Accordingly, the current regulator 202 may be configured to receive the torque reference value $T_{Ref}$ and drive motor currents of the AC motor using the PWM control signals for generating a torque corresponding to the torque reference value $T_{Ref}$. For example, the current regulator 202 may calculate the inverter voltages to drive the motor currents needed to operate the AC motor at a maximum efficiency.

SVPWM is an algorithm for the control of PWM in real-time. It is used for the creation of AC waveforms, and may be used to drive three-phase AC powered motors at varying speeds from a DC source using multiple switching transistors. While the examples herein are described in the context of three-phase motors, the examples are not limited thereto and may be applied to any load scheme.

The speed regulator 204 includes a summing junction 228 that may generate a speed error signal Δωm by calculating a difference between a speed reference value provided by the speed reference signal $\omega_{Ref}$ and the speed feedback signal ωm. For example, the summing junction 228 may be an error generator, such as a subtractor, that generate the speed error signal Δωm as a difference between the speed reference signal $\omega_{Ref}$ and the speed feedback signal ωm.

The speed regulator 204 may further include a PI compensator 230 (e.g., a PI controller) that regulates the torque reference value $T_{Ref}$ based on the speed error signal Δωm in order to drive an average speed error to zero so that the motor speed tracks the speed reference value provided by the speed reference signal $\omega_{Ref}$. In other words, the PI compensator 230 may be configured to, based on the speed error signal Δωm, regulate the torque reference value $T_{Ref}$ that is configured to sustain the speed reference value of the speed reference signal $\omega_{Ref}$. For example, the PI compensator 230 may generate an output signal $T_{PIO}$ (e.g., a proportional integral output (PIO)) based on the speed error signal Δωm to compensate for an error value of the speed error signal Δωm. A frequency component of the output signal $T_{PIO}$ may be denoted by a subscript "N." For example, a DC component of the output signal $T_{PIO}$ may be denoted $T_{PIO0}$, wherein N is 0 (zero). A first harmonic (e.g., a fundamental harmonic) of the of the output signal $T_{PIO}$ may be denoted $T_{PIO1}$, wherein N is 1. A second harmonic of the of the output signal $T_{PIO}$ may be denoted $T_{PIO2}$, wherein N is 2, and so on.

The speed regulator 204 may further include a load torque ripple compensator 232 that applies a torque feedforward function $T_{FF}(\theta m)$ to compensate for an AC component of the load torque that varies with the mechanical angle θm of the shaft (e.g., of the load). In other words, the load torque ripple compensator 232 applies the torque feedforward function $T_{FF}(\theta m)$ to compensate for the load torque ripple Tc (e.g., the compressor ripple AC component). The load torque ripple compensator 232 may apply the torque feedforward function $T_{FF}(\theta m)$ to reduce, eliminate, or otherwise suppress the load torque ripple in the torque reference value $T_{Ref}$ that occurs due to a non-linear relationship of the load torque to the mechanical angle of the shaft. In other words, the load torque ripple Tc varies (non-linearly) with the mechanical angle θm of the shaft.

Applying the torque feedforward function $T_{FF}(\theta m)$ may include generating a feedforward compensation signal $T_{FF}$ as a function of the mechanical angle θm of the shaft such that the feedforward compensation signal $T_{FF}$ matches a frequency, a magnitude, and a phase of the load torque ripple Tc. The frequency of the feedforward compensation signal $T_{FF}$ may be equal to the motor rotational frequency (e.g., the motor mechanical frequency) that can be derived directly from the mechanical angle θm of the shaft. In other words, the frequency of the feedforward compensation signal $T_{FF}$ may be determined by the torque feedforward function $T_{FF}(\theta m)$ based on the motor rotational frequency provided by the mechanical angle θm. Applying the torque feedforward function $T_{FF}(\theta m)$ may also include adding the feedforward compensation signal $T_{FF}$ to the output signal Trio of the PI compensator 230 to generate the torque reference value $T_{Ref}$. In some implementations, the speed regulator 204 may further include a summing junction 234 (e.g., an adder) that adds the feedforward compensation signal $T_{FF}$ to the output signal $T_{PIO}$ of the PI compensator 230. The load torque ripple compensator 232 may be configured to dynamically adjust the frequency, the magnitude, and the phase of the feedforward compensation signal $T_{FF}$ in real time as the load of the AC motor varies over time. For example, the magnitude of the feedforward compensation signal $T_{FF}$ may increase with increasing load and may decrease with decreasing load.

As indicated above, FIG. 2 is provided merely as an example. Other examples may differ from what is described with regard to FIG. 2. The number and arrangement of components shown in FIG. 2 are provided as an example. In practice, the motor control system 200 may include additional components, fewer components, different components, or differently arranged components than those shown in FIG. 2. Two or more components shown in FIG. 2 may be implemented within a single component, or a single component shown in FIG. 2 may be implemented as multiple, distributed components. Additionally, or alternatively, a set of components (e.g., one or more components) of the motor control system 200 may perform one or more functions described as being performed by another set of components of the motor control system 200.

Figure 3:
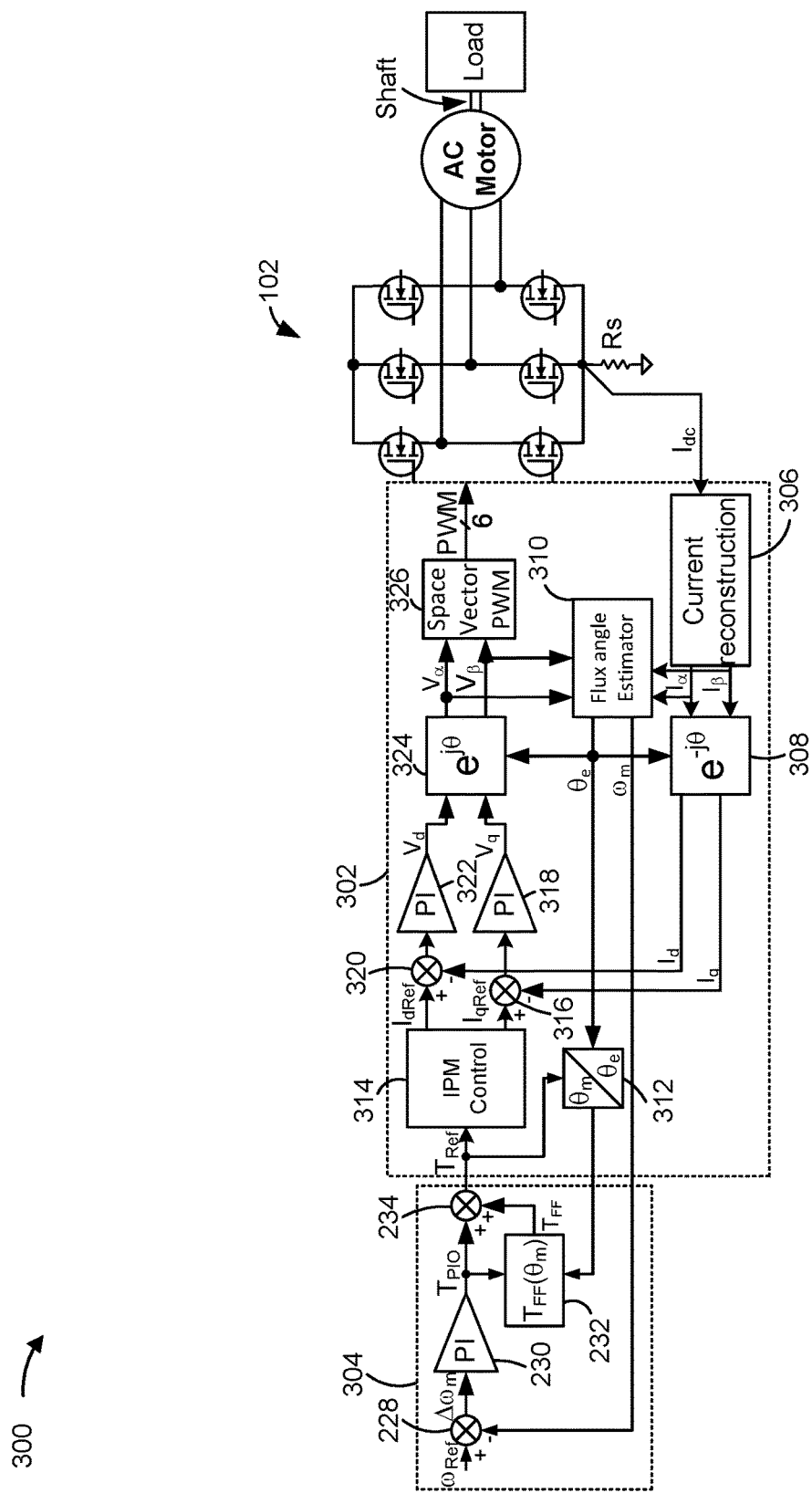
FIG. 3 illustrates a schematic block diagram illustrating a motor control system according to one or more implementations.

FIG. 3 illustrates a schematic block diagram illustrating a motor control system 300 according to one or more implementations. For example, the motor control system 300 may use a sensorless control implementation for interior permanent magnet (IPM) motors using a single shunt resistor (Rs) that is placed on a negative DC link (bus) of the power inverter 102. The motor control system 300 includes a current regulator 302 (e.g., a FOC-based current regulator) and a speed regulator 304. The current regulator 302 and the speed regulator 304 may be implemented as part of the controller 104.

The current regulator 302 and the speed regulator 304 each play a role at varying motor windings voltages of an AC motor to drive the AC motor at a reference speed value (e.g., a target speed) provided by a speed reference signal $\omega_{Ref}$. The AC motor may be coupled to a load via a shaft. However, instead of using a sensor-based interface, the current regulator 302 includes a phase current reconstruction circuit 306 as part of a measurement interface. The phase current reconstruction circuit 306 may use single shunt reconstruction to reconstruct each of the phase currents Iu, Iv, and Iw for each respective phase U, V, and W. For example, using single shunt reconstruction, the phase current reconstruction circuit 306 may measure a DC link current Idc in the shunt resistor Rs during active vectors of PWM cycle. The phase current reconstruction circuit 306 may receive samples of the DC link current Idc taken from the shunt resistor Rs and then use a SVPWM algorithm (e.g., software) to re-construct three phase currents in real-time. For example, in each PWM cycle, there are two different active vectors and the DC link current Idc in each active vector represents a current on one motor phase. The phase current reconstruction circuit 306 may include an ADC that samples the DC link current Idc (e.g., by measuring a voltage drop across the shunt resistor Rs) during the active vectors of the PWM cycle. A calculation of a third phase current value is possible because, at a balanced condition, a sum of all three winding currents is zero. Thus, the phase current reconstruction circuit 306 may include a processor that calculates the three phase currents Iu, Iv, and Iw from ADC samples.

The phase current reconstruction circuit 306 may also include a three-phase to two-phase converter that may use a Clarke transform to apply an alpha-beta transformation on the three phase currents Iu, Iv, and Iw calculated by the phase current reconstruction circuit 306 to derive an alpha current Iα and a beta current Iβ. The FOC further uses a vector rotation (e.g., a cordic rotation) at a vector rotation unit 308 to transform motor winding currents using alpha and beta currents Iα and Iβ into two quasi-DC current components, including a d-axis current Id that reinforces or weakens a rotor field and a q-axis current Iq that generates motor torque. The vector rotation of the vector rotation unit 308 may be driven by a rotor electrical angle θe determined by a flux angle estimator 310 of the measurement interface so that the d-axis current Id and q-axis current Iq represent a rotor field component and a torque component of the motor current, respectively.

The flux angle estimator 310 performs rotor angle and motor speed measurements and estimation based on motor winding voltage and current. For example, the flux angle estimator 310 may generate angle signals from voltage and current information Vα, Vβ, Iα, and Iβ. The flux angle estimator 310 may also include an angle phase-locked loop (PLL) that outputs the rotor electrical angle θe and the speed feedback signal ωm representative of a motor speed of the AC motor (e.g., a rotational speed of the shaft).

In some implementations, flux may be calculated, by the flux angle estimator 310, based on feedback current (e.g., using alpha and beta currents Iα and Iβ), estimated voltages Vα and Vβ (based on DC bus feedback voltage and a modulation index), and motor parameters (e.g., inductance and resistance). The output of a flux estimator of the flux angle estimator 310 may represent rotor magnet fluxes in alpha-beta two-phase quantities φα and φβ in a stationary orthogonal frame, with the U-phase aligned with alpha.

The angle PLL may estimate a flux angle (e.g., an estimated rotor angle) and motor speed from a rotor magnet flux vector of the alpha-beta two-phase quantities φα and φβ. A vector rotation of the angle PLL calculates an error between a rotor flux angle and the estimated rotor angle. A PI compensator and integrator of the angle PLL, in the closed loop path, force angle and frequency estimates to track the angle and the frequency of the rotor flux angle. The motor speed is derived from a rotor frequency according to a number of rotor poles. Thus, the flux angle estimator 310 may derive the rotor electrical angle θe and speed feedback signal ωm from motor winding voltages (e.g., alpha and beta voltages Vα and Vβ) and motor winding currents (e.g., alpha and beta currents Iα and Iβ). However, the speed feedback signal ωm includes an AC error component corresponding to the load torque ripple that is a target for compensation.

The current regulator 302 may further include a scaling and alignment unit 312 that calculates the mechanical angle θm from the rotor electrical angle θe, provided by the flux angle estimator 310, and a torque reference value $T_{Ref}$ provide by the speed regulator 304.

The current regulator 302 may further include an IPM controller 314 that may maximize the torque per amp in IPM motors. For example, the IPM controller 314 may adjust a d-axis reference current IdRef to maximize the motor torque per ampere when there is a difference between motor Q-axis and D-axis inductances. The IPM controller 314 may calculate a non-zero d-axis reference current IdRef based on an angle advance which is a function of the motor parameters and the motor current. The angle advance calculation can be implemented as a linear approximation or as a look up table derived from motor characterization. This function optimizes the motor operating point of the motor for maximum efficiency.

A q-axis summing junction 316 and PI compensator 318 (e.g., a PI controller) regulate the q-axis voltage Vq in a rotating reference frame such that the q-axis current Iq tracks a torque reference value $T_{Ref}$ output from the speed regulator 304. For example, the q-axis summing junction 316 may be an error generator, such as a subtractor, that receives the torque reference value $T_{Ref}$ as a setpoint (SP) value and the q-axis current Iq from the vector rotation unit 308 as an actual measured value (PV), and generates an error value ErrIq. The PI compensator 318 regulates the q-axis voltage Vq based on the error value ErrIq.

A d-axis summing junction 320 and a PI compensator 322 (e.g., a PI controller) regulate the d-axis voltage Vd in the rotating reference frame so the d-axis current Id follows a d-axis current reference IdRef to maximize motor efficiency. For example, the d-axis summing junction 320 may be an error generator, such as a subtractor, that receives the d-axis current reference IdRef as a setpoint (SP) value and the d-axis current Id from the vector rotation unit 308 as an actual measured value (PV), and generates an error value ErrId. The PI compensator 322 regulates the d-axis voltage Vd based on the error value ErrId.

A forward vector rotation unit 324 applies a forward vector rotation to the q-axis voltage Vq and the d-axis voltage Vd, and transforms the q-axis voltage Vq and the d-axis voltage Vd into two phase AC voltage components Vα and Vβ based on the rotor electrical angle θe calculated by the flux angle estimator 310. Thus, the forward vector rotation unit 324 transforms the d-axis voltage Vd and the q-axis voltage Vq into the two phase AC voltage signals Vα and Vβ in a stator reference frame that drive a space vector PWM modulator 326 so that the three phase motor voltages drive a target motor field and torque components.

The space vector PWM modulator 326 receives the two phase AC voltage components Vα and Vβ and generates the inverter switching signals (e.g., six paths of PWM control signals output from controller 104) based on the Vα and Vβ voltage inputs and SVPWM. The gate driver system 106 then turns on/off the respective power transistors 108u, 108v, 108w, 109u, 109v, and 109w based on the PWM control signals. Accordingly, the current regulator 302 may be configured to receive the torque reference value $T_{Ref}$ and drive motor currents of the AC motor using the PWM control signals for generating a torque corresponding to the torque reference value $T_{Ref}$. For example, the current regulator 302 may calculate the inverter voltages to drive the motor currents needed to operate the AC motor at a maximum efficiency.

The speed regulator 304 includes the summing junction 228, the PI compensator 230, the load torque ripple compensator 232, and the summing junction 234, as similarly described in connection with FIG. 2, with the exception that the summing junction 228 receives the speed feedback signal ωm from the flux angle estimator 310 and the load torque ripple compensator 232 receives the mechanical angle θm of the shaft from the scaling and alignment unit 312.

As indicated above, FIG. 3 is provided merely as an example. Other examples may differ from what is described with regard to FIG. 3. The number and arrangement of components shown in FIG. 3 are provided as an example. In practice, the motor control system 300 may include additional components, fewer components, different components, or differently arranged components than those shown in FIG. 3. Two or more components shown in FIG. 3 may be implemented within a single component, or a single component shown in FIG. 3 may be implemented as multiple, distributed components. Additionally, or alternatively, a set of components (e.g., one or more components) of the motor control system 300 may perform one or more functions described as being performed by another set of components of the motor control system 300.

Figure 4:
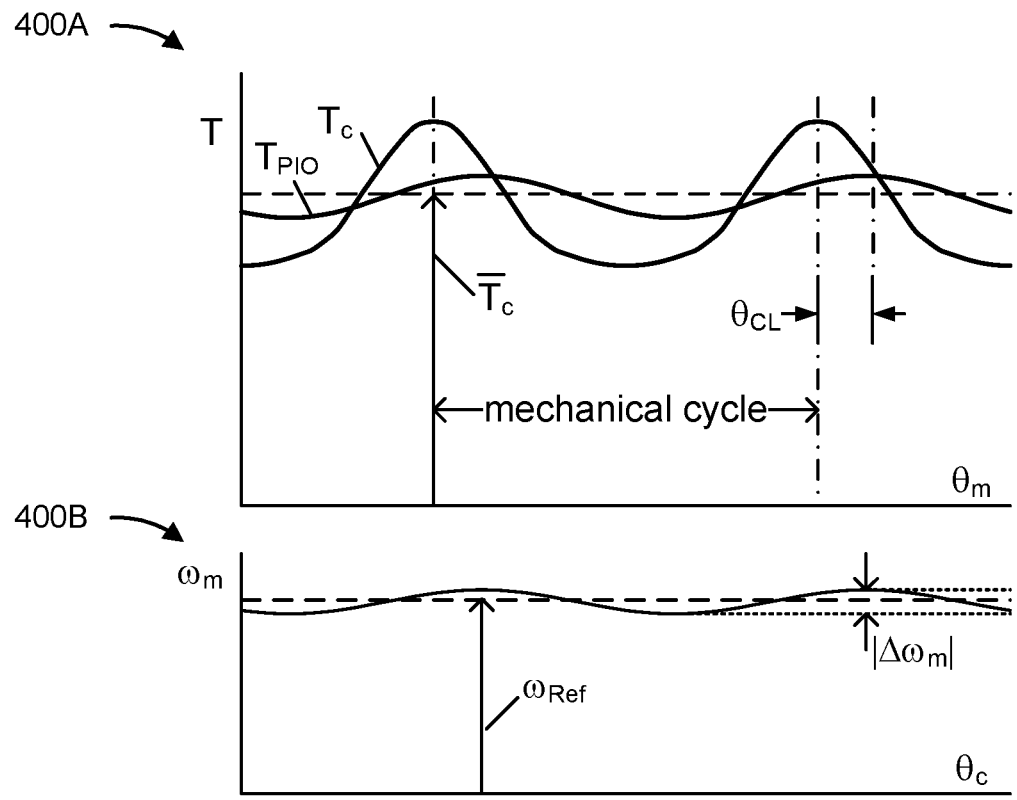
FIG. 4 illustrates an upper diagram and a lower diagram that demonstrate why the proportional integral (PI) compensator of the speed regulator, alone (e.g., without feedforward control), cannot fully suppress load torque ripple components of the load torque ripple.

FIG. 4 illustrates an upper diagram 400A and a lower diagram 400B that demonstrate why the PI compensator 230 of the speed regulator 304, alone (e.g., without feedforward control), cannot fully suppress load torque ripple components of the load torque ripple Tc. The upper diagram 400A shows an average load torque ripple ($\overline{T}_c$) of the load torque ripple Tc. The load torque ripple Tc causes the output signal $T_{PIO}$ of the PI compensator 230 to also have an AC error component, which is shifted from the load torque ripple Tc in phase by a phase difference $\theta_{CL}$. The lower diagram 400B shows that the speed feedback signal ωm has an AC error component (e.g., the speed error signal Δωm) that causes the speed feedback signal ωm to oscillate from the speed reference signal ωref resultant from the net shaft ripple torque filtered by the load (e.g., due to the load torque ripple Tc). The speed error signal Δωm is a function of a load torque ripple angle θc of the load torque ripple Tc. An integrator of the PI compensator 230 drives the output signal $T_{PIO}$ until the average speed error is zero, but the PI compensator 230 cannot track the per cycle AC component of the load torque ripple Tc because the gain of the PI compensator 230 changes with frequency. At very high speeds, mechanical filtering provided by compressor load inertia reduces the speed ripple of the speed feedback signal ωm to an acceptable level. However, there is a range of operating speeds where there is noticeable shaft vibration, acoustic noise, and speed ripple.

As indicated above, FIG. 4 is provided merely as an example. Other examples may differ from what is described with regard to FIG. 4.

Figure 5:
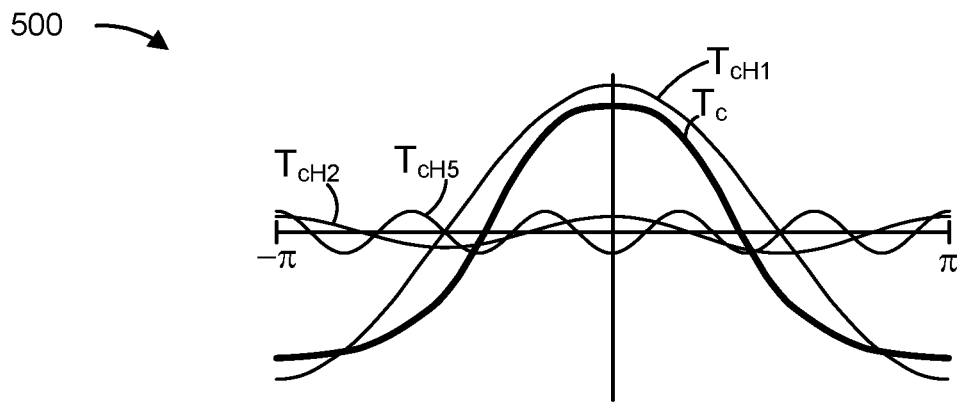
FIG. 5 illustrates an example of harmonic components of a load torque ripple.

FIG. 5 illustrates an example 500 of harmonic components of a load torque ripple Tc. A first harmonic frequency component $T_{CH1}$ (e.g., a fundamental frequency component of the load torque ripple Tc), a second harmonic frequency component $T_{CH2}$, and a fifth harmonic frequency component $T_{CH5}$ of the load torque ripple Tc are shown. The torque feedforward function $T_{FF}(θm)$ implemented by the load torque ripple compensator 232 may be a first order torque feedforward function that is configured to match the feedforward compensation signal $T_{FF}$ to the first harmonic frequency component $T_{CH1}$ of the load torque ripple Tc in frequency, magnitude (gain), and phase to cancel the first harmonic frequency component $T_{CH1}$ of the load torque ripple Tc. Thus, the torque feedforward function $T_{FF}(θm)$ implemented by the load torque ripple compensator 232 may be configured to measure at least one harmonic frequency component of the load torque ripple Tc to estimate the magnitude and the phase of the load torque ripple Tc. The load torque ripple compensator 232 may measure at least one harmonic frequency component of the load torque ripple Tc by measuring either at least one harmonic component (e.g., the fundamental harmonic) of the output signal of the PI compensator 230 or at least one harmonic component (e.g., the fundamental harmonic) of the speed error signal Δωm. In some implementations, feedforward compensation may be implemented for more than one harmonic frequency by adding additional load torque ripple compensators (e.g., feedforward compensators) in parallel. For example, one load torque ripple compensator may be configured to measure the first harmonic frequency component $T_{CH1}$ of the load torque ripple Tc and another load torque ripple compensator may be configured to measure another harmonic frequency component of the load torque ripple Tc.

As indicated above, FIG. 5 is provided merely as an example. Other examples may differ from what is described with regard to FIG. 5.

Figure 6:
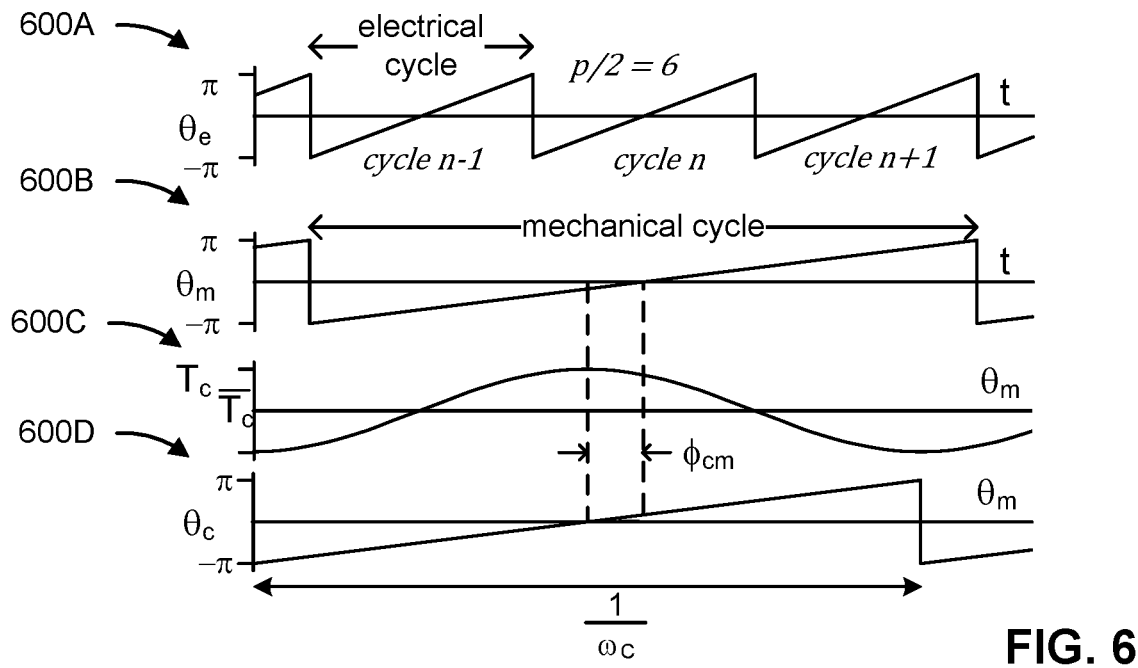
FIG. 6 illustrates diagrams that show how a load ripple frequency of a load torque ripple represented by one period of load torque ripple is directly related to the motor electrical frequency of the rotor electrical angle and a mechanical frequency of the mechanical angle through a number of motor poles.

FIG. 6 illustrates diagrams 600A, 600B, 600C, and 600D that show how a load ripple frequency ωc of a load torque ripple Tc represented by one period of load torque ripple Tc is directly related to the motor electrical frequency of the rotor electrical angle θe and a mechanical frequency of the mechanical angle θm through the number of motor poles (p). The phase difference φcm of the load torque ripple angle θc relative to the mechanical angle θm is fixed once the AC motor and load are assembled together. A magnitude of the load torque ripple Tc changes with application load changes.

As indicated above, FIG. 6 is provided merely as an example. Other examples may differ from what is described with regard to FIG. 6.

Figure 7:
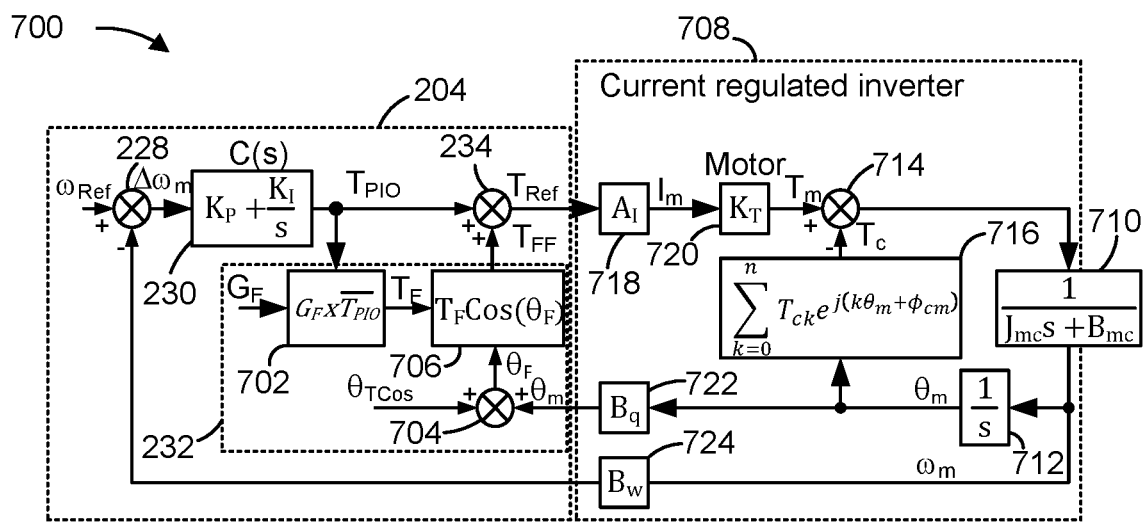
FIG. 7 illustrates a torque compensation system model according to one or more implementations.

FIG. 7 illustrates a torque compensation system model 700 according to one or more implementations. The torque compensation system model 700 is a frequency domain model of a torque compensation system.

The speed regulator 204 (or 304) includes the load torque ripple compensator 232 that applies a torque feedforward function $T_{FF}(θm)$ and a compensator transfer function C(s) for the PI compensator 230. A gain function 702 calculates a torque feedforward gain and provides the torque feedforward gain in a torque feedforward gain signal $T_F$. The gain function 702 calculates a torque feedforward gain from a product of an average load torque $\overline{T_{PIO}}$ and a feedforward gain parameter $G_F$ (e.g., a feedforward scale factor) so that a magnitude of the torque feedforward gain signal $T_F$ increases with increasing load. The feedforward gain parameter $G_F$ may be matched to a magnitude of the first harmonic frequency component (e.g., the fundamental harmonic) of the load torque ripple Tc.

A summing junction 704 adds a feedforward phase parameter $θ_{T\ Cos}$ (e.g., a phase offset) to the mechanical angle θm to derive a feedforward phase $θ_F$ in order to account for alignment mismatch corresponding to the phase difference φcm that is present when the system (e.g., the motor and the load) is assembled. The feedforward phase parameter $θ_{T\ Cos}$ may be matched to a phase of the first harmonic frequency component (e.g., the fundamental harmonic) of the load torque ripple Tc.

A trigonometric function 706 (e.g., $T_F \text{Cos}(θ_F)$) generates the feedforward compensation signal $T_{FF}$ as a sinusoidal torque ripple compensation signal using the feedforward gain signal $T_F$ (e.g., the torque feedforward gain) and the feedforward phase $θ_F$. The feedforward compensation signal $T_{FF}$ may be matched in frequency, magnitude, and phase to the first harmonic frequency component (e.g., the fundamental harmonic) of the load torque ripple Tc. The gain function 702, the summing junction 704, and the trigonometric function 706 may represent the torque feedforward function $T_{FF}(θm)$ of the speed regulator 204 (or 304).

Thus, the torque feedforward function $T_{FF}(θm)$ includes the feedforward gain parameter $G_F$ and the feedforward phase parameter $θ_{T\ Cos}$ used as inputs for generating the feedforward compensation signal $T_{FF}$. Additionally, at the gain function 702, the load torque ripple compensator 232 is configured to multiply the feedforward gain parameter $G_F$ with the average of the output signal of the PI compensator 230 to determine torque feedforward gain signal $T_F$ and use the torque feedforward gain signal $T_F$ as the magnitude of the feedforward compensation signal $T_{FF}$. In addition, the load torque ripple compensator 232 is configured to add the feedforward phase parameter $θ_{T\ Cos}$ to the mechanical angle θm to determine the feedforward phase $θ_F$ to be used as the phase of the feedforward compensation signal $T_{FF}$.

The torque compensation system model 700 further includes a system model 708 of the current regulator 202 (or 302), the AC motor, and the load. A first order system 710 models a dynamic friction and inertia of the load and the AC motor, and provides the speed feedback signal ωm. A speed integrator 712 models a shaft angular rotation and provides the mechanical angle θm. A summing junction 714 and a multi-order Fourier series 716 model the non-linear mechanical load. In particular, the multi-order Fourier series 716 models the load torque ripple Tc. The rest of the system model 708 includes linear models for an FOC-based current regulated three-phase voltage inverter 718 that provides motor current Im, AC motor torque production 720 that provides motor torque Tm, an angle sensor interface (Bq) 722, and a speed sensor interface (Bw) 724.

As indicated above, FIG. 7 is provided merely as an example. Other examples may differ from what is described with regard to FIG. 7.

Figure 8:
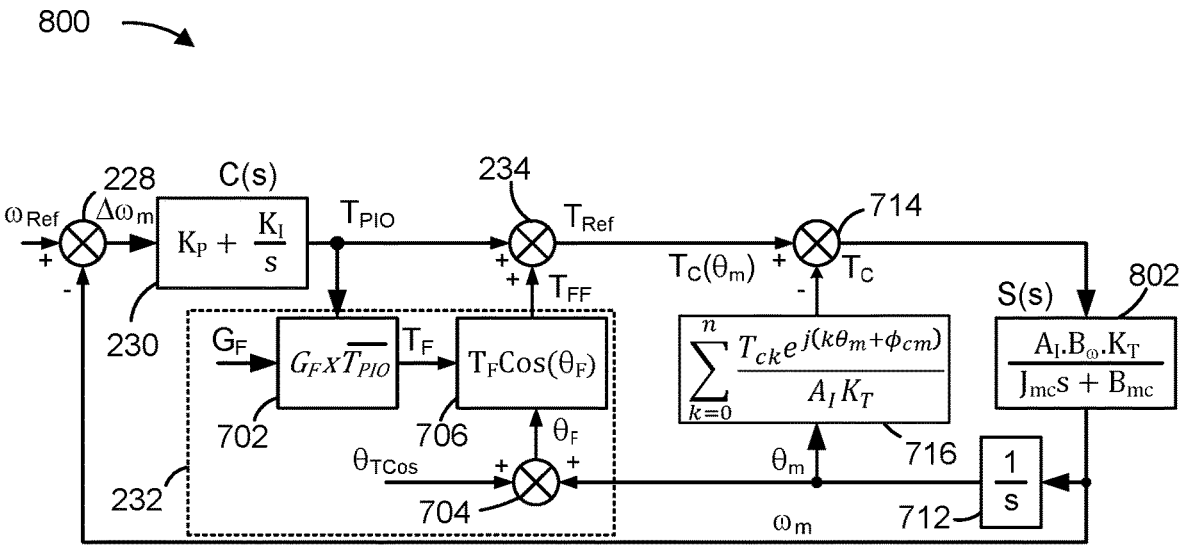
FIG. 8 illustrates a torque compensation system model according to one or more implementations.

FIG. 8 illustrates a torque compensation system model 800 according to one or more implementations. The torque compensation system model 800 represents the motor and the load in a speed regulator scaling domain to enable a calculation of the feedforward compensation signal $T_{FF}$ used to reduce or cancel the fundamental harmonic (e.g., first order ripple component) of the (non-linear) load torque ripple Tc. The FOC-based current regulated three-phase voltage inverter 718, the AC motor torque production 720, the angle sensor interface (Bq) 722, and the speed sensor interface (Bw) 724 illustrated in FIG. 7 are combined into a compressor load model S(s) 802 represented in the speed regulator scaling domain.

As indicated above, FIG. 8 is provided merely as an example. Other examples may differ from what is described with regard to FIG. 8.

Figure 9:
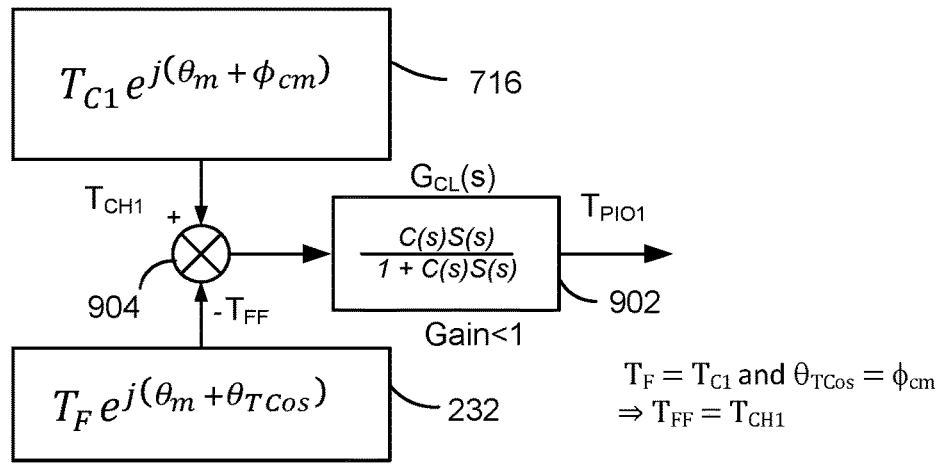
FIG. 9 illustrates a consolidated torque compensation system model according to one or more implementations.

FIG. 9 illustrates a consolidated torque compensation system model 900 according to one or more implementations. For example, the consolidated torque compensation system model 900 maybe a simplified version of the torque compensation system model 800. Additionally, the consolidated torque compensation system model 900 may be a first order harmonic component model.

The PI compensator 230 is represented by the compensator transfer function C(s), the load model is represented by S(s) (e.g., a mechanical system transfer function), and the torque feedforward gain signal $T_F$ (e.g., the torque feedforward gain) and load torque ripple Tc represented by mathematical functions in block 232 and block 716, respectively. Block 902 represents a closed loop gain of the speed regulator 204 (or 304) via a closed loop transfer function $G_{CL}(s)$. The feedforward compensation signal $T_{FF}$ is subtracted from the first harmonic frequency component $T_{CH1}$ (e.g., the first order ripple component) of the load torque ripple Tc by a summing junction 904 in order to compensate for the (non-linear) first harmonic frequency component $T_{CH1}$. Thus, the frequency, the magnitude (gain), and the phase of feedforward compensation signal $T_{FF}$ may match or substantially match the first harmonic frequency component $T_{CH1}$ in order to cancel out or otherwise reduce the load torque ripple Tc.

The torque feedforward function $T_{FF}(\theta m)$ reduces or eliminates motor load torque ripple in motor drives at medium to high speeds when the ripple frequency is close to or greater than the bandwidth of the speed regulator 204 (or 304). The torque feedforward function $T_{FF}(\theta m)$ automatically determines the AC components of the motor load torque and generates the feedforward compensation signal $T_{FF}$ to reduce or eliminate mechanical vibrations. The frequency of the feedforward compensation signal $T_{FF}$ may be determined by the motor drive, but the feedforward compensation signal $T_{FF}$ should also be matched in phase and magnitude with the mechanical load torque ripple. The torque feedforward function $T_{FF}(\theta m)$ may use a cross-correlation function to measure direct and quadrature components of the first harmonic of the output signal of the PI compensator 230 in the motor speed loop or may use a cross-correlation function to measure direct and quadrature components of the first harmonic of the output signal of the speed error signal $\Delta\omega m$ in the motor speed loop. For example, each AC frequency component of the output signal of the PI compensator 230 and the speed error signal $\Delta\omega m$ is a vector with magnitude and phase relative to a common reference angle and can be represented a complex number.

The cross-correlation function may extract the complex vector representing the first harmonic component of the output signal of the PI compensator 230 or the speed error signal $\Delta\omega m$ relative to a reference angle (e.g., the feedforward phase 6F). The load torque ripple compensator 232 may take two sequential measurements at two different test feedforward levels of feedforward torque. The load torque ripple compensator 232 may calculate the cancelling feedforward gain parameter $G_F$ and the feedforward phase parameter $\theta_{T\_Cos}$ from a linear combination of the two sequential measurements and the two different test feedforward levels.

Equation 3 represents a relationship between the first harmonic frequency component $T_{CH1}$, the feedforward compensation signal $T_{FF}$, the closed loop transfer function $G_{CL}(s)$, and a first harmonic component $T_{PIO1}$ the output signal $T_{PIO}$ of the PI compensator 230.

$$T_{PIO1} = \left[\frac{C(s)S(s)}{1 + C(s)S(s)}\right](T_{CH1} - T_{FF}). \quad \text{Eq. 3}$$

If the feedforward compensation signal $T_{FF}$ is known in the consolidated torque compensation system model 900, the output signal $T_{PIO}$ of the PI compensator 230 output can be measured directly, but the load torque ripple Tc and mechanical system parameters cannot be measured. Instead, two output signals $T_{PIO}$ with different feedforward torque values $[T_{FF}]_1$ and $[T_{FF}]_2$ at a same load may yield an indirect measure of the unknown ripple torque component of the load torque ripple Tc. In Equations 4 and 5, $[T_{FF}]_1$ and $[T_{FF}]_2$ are two different feedforward torque values while $[T_{PIO1}]_1$ and $[T_{PIO1}]_2$ are corresponding fundamental harmonic components of the output signal $T_{PIO}$ of the PI compensator 230, respectively. For example, the feedforward compensation signal $T_{FF}$ may be generated with two different values $[G_F]_1$ and $[G_F]_2$ for feedforward gain parameter $G_F$ to generate the two different feedforward torque values $[T_{FF}]_1$ and $[T_{FF}]_2$ (e.g., two different feedforward compensation signals $T_{FF}$). The fundamental harmonic component of the output signal $T_{PIO}$ of the PI compensator 230 may be measured with the feedforward compensation signal $T_{FF}$ set to feedforward torque value $[T_{FF}]_1$ (e.g., with the feedforward gain parameter $G_F$ set to a first value) to obtain $[T_{PIO1}]_1$. Then the fundamental harmonic component of the output signal $T_{PIO}$ of the PI compensator 230 may be measured with the feedforward compensation signal $T_{FF}$ set to feedforward torque value $[T_{FF}]_2$ (e.g., with the feedforward gain parameter $G_F$ set to a second value) to obtain $[T_{PIO1}]_2$.

$$[T_{PIO1}]_1 = \left[\frac{C(s)S(s)}{1 + C(s)S(s)}\right](T_{CH1} - [T_{FF}]_1), \quad \text{Eq. 4}$$

$$[T_{PIO1}]_2 = \left[\frac{C(s)S(s)}{1 + C(s)S(s)}\right](T_{CH1} - [T_{FF}]_2). \quad \text{Eq. 5}$$

Equation 6 demonstrates that a difference between the two fundamental harmonic components of the output signal $T_{PIO}$ $[T_{PO11}]_1$ and $[T_{PIO1}]_2$ yields an equation without the load torque ripple Tc, with one unknown term (e.g., the closed loop transfer function $G_{CL}(s)$) remaining.

$$[T_{PIO1}]_2 - [T_{PIO1}]_1 = \left[\frac{C(s)S(s)}{1 + C(s)S(s)}\right]([T_{FF}]_1 - [T_{FF}]_2). \quad \text{Eq. 6}$$

The ratio R12 yields Equation 8 for the first harmonic frequency component TCH1 of the load torque ripple Tc. The first harmonic frequency component TCH1 of the load torque ripple Tc is derived based on the ratio R12 and the feedforward torque values [TFF]$_1$ and [TFF]$_2$ that correspond to different sets of trial feedforward values (e.g., feedforward gain parameter GF and the feedforward phase parameter θT Cos).

Equation 7 provides a ratio $R_{12}$ of a first measurement of the fundamental harmonic component of the output signal $T_{PIO}$ $[T_{PIO1}]_1$ and the difference between the two fundamental harmonic components of the output signal $T_{PIO}$ $[T_{PIO1}]_1$ and $[T_{PIO1}]_2$.

$$R_{12} = \frac{[T_{PIO1}]_1}{[T_{PIO1}]_1 - [T_{PIO1}]_2} = \frac{T_{CH1} - [T_{FF}]_1}{([T_{FF}]_2 - [T_{FF}]_1)}. \quad \text{Eq. 7}$$

The ratio $R_{12}$ yields Equation 8 for the first harmonic frequency component $T_{CH1}$ of the load torque ripple Tc. The first harmonic frequency component $T_{CH1}$ of the load torque ripple Tc is derived based on the ratio $R_{12}$ and the feedforward torque values $[T_{FF}]_1$ and $[T_{FF}]_2$ that correspond to different sets of trial feedforward values (e.g., feedforward gain parameter $G_F$ and the feedforward phase parameter $\theta_T$ Cos).

$$T_{CH1} = [T_{FF}]_1 + ([T_{FF}]_2 - [T_{FF}]_1)R_{12}. \quad \text{Eq. 8}$$

The ratio $R_{12}$ yields Equation 8 for the first harmonic frequency component $T_{CH1}$ of the load torque ripple Tc. The first harmonic frequency component $T_{CH1}$ of the load torque ripple Tc is derived based on the ratio $R_{12}$ and the feedforward torque values $[T_{FF}]_1$ and $[T_{FF}]_2$ that correspond to different sets of trial feedforward values (e.g., feedforward gain parameter $G_F$ and the feedforward phase parameter $\theta_T$ Cos). The first harmonic frequency component $T_{CH1}$ may be used to determine the feedforward parameters $G_F$ and $\theta_{T\,Cos}$ that are to be used as inputs at the load torque ripple compensator 232 for generating the feedforward compensation signal $T_{FF}$ that is to be provided to the summing junction 234 for compensating for the load torque ripple Tc. The feedforward parameters $G_F$ and $\theta_{T\,Cos}$ may be calculated using Equations 9 and/or 10, $$T_F e^{j(\theta_m + \theta_{TCos})} = T_{C1} e^{j(\theta_m + \phi_{cm})} \Rightarrow \theta_{TCos} = \phi_{cm} = \arg(T_{CH1}) \text{ and} \quad \text{Eq. 9}$$

$$[G_F]_3 = T_{C1} = |T_{CH1}|,$$

$$|T_{CH1}| = |T_{PIO0}| \times [G_F]_3 = |T_{PIO0}| \times |[G_F]_1 + ([G_F]_2 - [G_F]_1)R_{12}|, \quad \text{Eq. 10}$$

where $[G_F]_3$ denotes an updated value of the feedforward gain parameter $G_F$ to be used as an input for generating the feedforward compensation signal $T_{FF}$ that is to be provided to the summing junction 234 for compensating for the load torque ripple Tc. $T_{C1}$ is an absolute value of the first harmonic frequency component $T_{CH1}$.

As indicated above, FIG. 9 is provided merely as an example. Other examples may differ from what is described with regard to FIG. 9.

Figure 10:
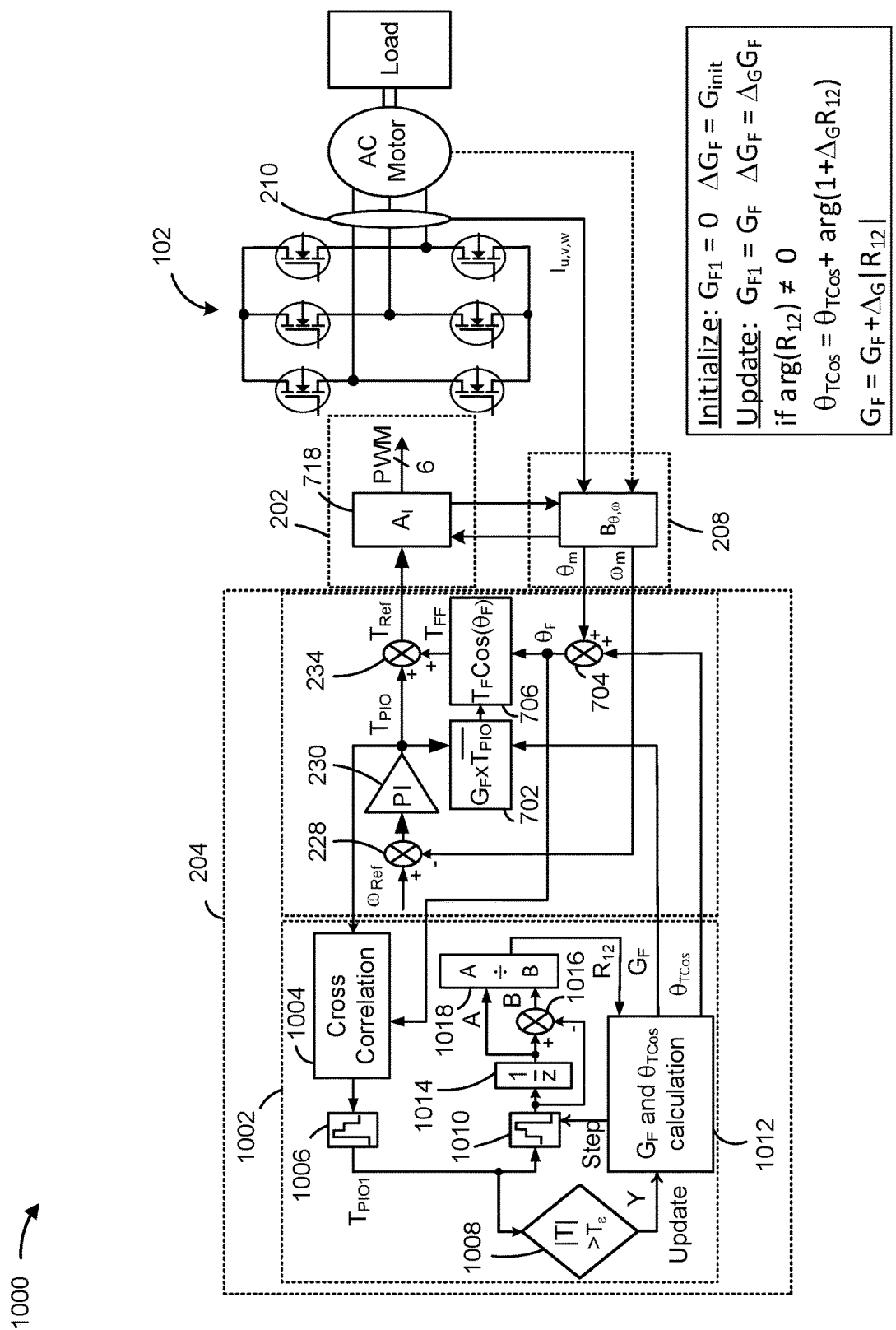
FIG. 10 illustrates a system model of a motor control algorithm with automated adjustment of torque compensation according to one or more implementations.

FIG. 10 illustrates a system model 1000 of a motor control algorithm with automated adjustment of torque compensation according to one or more implementations. The system model 1000 includes a cross-correlation unit 1002 as part of the load torque ripple compensator 232 of the speed regulator 204 (or 304). The cross-correlation unit 1002 may use a cross-correlation function to measure at least one harmonic component (e.g., the fundamental harmonic) of the output signal $T_{PIO}$ of the PI compensator 230 and determine the feedforward gain parameter $G_F$ (e.g., updated gain value $[G_F]_3$) and the feedforward phase parameter $\theta_{T\,Cos}$ based on the at least one harmonic component of the output signal Trio of the PI compensator 230. Thus, the cross-correlation function may be performed by at least one processor or other processing hardware. For example, the cross-correlation unit 1002 may automatically determine the feedforward gain parameter $G_F$ and the feedforward phase parameter $\theta_{T\,Cos}$ used for generating the feedforward compensation signal $T_{FF}$ that matches the first harmonic frequency component $T_{CH1}$ of the load torque ripple Tc.

The cross-correlation unit 1002 may include a cross-correlation block 1004 that may extract the fundamental harmonic component $T_{PIO1}$ of the output signal $T_{PIO}$ from the PI compensator 230. For example, the cross-correlation block 1004 may extract a complex vector representing the output signal $T_{PIO}$ that represents a magnitude and a phase of the fundamental harmonic component $T_{PIO1}$. A first zero-order hold register 1006 may store a complex value of the complex vector (e.g., the magnitude and the phase) for each instance the cross-correlation calculation is performed (e.g., for each sample of the output signal $T_{PIO}$). Each sample of the fundamental harmonic component $T_{PIO1}$ acquired by the first zero-order hold register 1006 may be associated with a current feedforward gain parameter $G_F$ and a current feedforward phase parameter $\theta_{T\,Cos}$ that are used for generating a current feedforward compensation signal $T_{FF}$.

A threshold comparator 1008 may calculate the magnitude of the fundamental harmonic component $T_{PIO1}$ from the complex value provided by the first zero-order hold register 1006. Additionally, the threshold comparator 1008 may compare the magnitude |T| of the fundamental harmonic component $T_{PIO1}$ to a threshold value $T_\varepsilon$ and trigger an adjustment to the feedforward gain parameter $G_F$ and the feedforward phase parameter $\theta_{T\,Cos}$ if the threshold comparator 1008 determines that the magnitude |T| of the fundamental harmonic component $T_{PIO1}$ satisfies the threshold value $T_\varepsilon$ (e.g., if the magnitude |T| of the fundamental harmonic component $T_{PIO1}$ is greater than the threshold value $T_\varepsilon$).

If a gain adjustment is required based on the magnitude |T| of the fundamental harmonic component $T_{PIO1}$ satisfying the threshold value $T_\varepsilon$, a second zero-order hold register 1010 stores the complex value of the fundamental harmonic component $T_{PIO1}$ as a first sample $[T_{PIO1}]_1$ of the magnitude and the phase of the fundamental harmonic $T_{PIO1}$. The feedforward gain parameter $G_F$ of the feedforward compensation signal $T_{FF}$ associated with the first sample $[T_{PO11}]_1$ is also known and may be used as gain value $[G_F]_1$. Thus, the feedforward compensation signal $T_{FF}$ associated with gain value $[G_F]_1$ may be referred to as the feedforward torque value $[T_{FF}]_1$.

A main algorithm block 1012 may adjust the feedforward gain parameter $G_F$ provided to the gain function 702 by a small adjustment ΔG (e.g., an arbitrary gain setting) in order to adjust the feedforward compensation signal $T_{FF}$ for a second measurement. In this instance, the adjusted feedforward gain parameter $G_F$ may be used as gain value $[G_F]_2$ and the feedforward compensation signal $T_{FF}$ associated with gain value $[G_F]_2$ may be referred to as the feedforward torque value $[T_{FF}]_2$. Once the feedforward gain parameter $G_F$ has been adjusted from gain value $[G_F]_1$ to gain value $[G_F]_2$ and the system stabilizes (e.g., after a predetermined delay imposed by a delay element 1014), the second zero-order hold register 1010 may acquire a complex value of the fundamental harmonic component $T_{PIO1}$ as a second sample $[T_{PIO1}]_2$ of the magnitude and the phase of the fundamental harmonic $T_{PIO1}$. Calculation units 1016 and 1018 may be configured to calculate the ratio $R_{12}$ according to Equation 7, where A denotes the magnitude of the first sample (e.g., $[T_{PO11}]_1$) and B denotes the difference between the magnitude of the first sample (e.g., $[T_{PO11}]_1$) and the magnitude of the second sample (e.g., $[T_{PIO1}]_2$). Thus, the calculation unit 1016 may be a subtractor component that subtracts $[T_{PIO1}]_2$ from $[T_{PO11}]_1$ to obtain a divisor variable (e.g., B) of a division operation (e.g., according to Equation 7). The calculation unit 1018 may be a divider component that uses the magnitude of the first sample (e.g., $[T_{PIO1}]_1$) as a dividend variable (e.g., A) of the division operation. The calculation unit 1018 calculates the ratio $R_{12}$ according to Equation 7 based on A and B, and provides the ratio $R_{12}$ to the main algorithm block 1012. The main algorithm block 1012 may be configured to calculate updated values for the feedforward gain parameter $G_F$ and the feedforward phase parameter $\theta_{T\,Cos}$ from Equations 9 and/or 10 using the ratio $R_{12}$. The main algorithm block 1012 may provide the updated values for the feedforward gain parameter $G_F$ and the feedforward phase parameter $\theta_{T\,Cos}$ to the gain function 702 and the summing junction 704, respectively, in order to update the feedforward compensation signal $T_{FF}$ that is to be used for compensating for the load torque ripple Tc.

During startup of the system model 1000 (e.g., during initialization of the motor controller), the system model 1000 may calculate initial values for the feedforward gain parameter $G_F$ and the feedforward phase parameter $\theta_{T\,Cos}$ by setting the gain value $[G_F]_1$ to zero and setting the gain value $[G_F]_2$ to an arbitrary gain setting (e.g., Ginit) different than zero. Thus, the first sample (e.g., $[T_{PIO1}]_1$) can be obtained when the feedforward gain parameter $G_F$ is zero and the second sample (e.g., $[T_{PIO1}]_1$) can be obtained when the feedforward gain parameter $G_F$ is set to the arbitrary gain setting in order to obtain an initial value of the ratio $R_{12}$. The initial value of ratio $R_{12}$ can be used by the main algorithm block 1012 to calculate the initial values for the feedforward gain parameter $G_F$ and the feedforward phase parameter $\theta_{T\,Cos}$. When the first gain value is set to zero a vector angle (phase) of the ratio $R_{12}$ is equal to a phase difference between a fundamental harmonic AC torque component of the compressor and the feedforward compensation signal $T_{FF}$. When the ratio $R_{12}$ (e.g., the phase difference) is for the feedforward phase parameter $\theta_{T\,Cos}$, the phase error goes to zero.

After initialization, the system model 1000 may use the threshold comparator 1008, as described above, to determine when an update to the feedforward gain parameter $G_F$ and the feedforward phase parameter $\theta_{T\,Cos}$ should be performed for updating the feedforward compensation signal $T_{FF}$.

Thus, the load torque ripple compensator 232 may be configured to measure a first sample $[T_{PIO1}]_1$ of a magnitude and a phase of a fundamental harmonic $T_{PIO1}$ of the output signal $T_{PIO}$ of the PI compensator 230 with the feedforward gain parameter $G_F$ set to a first gain value $[G_F]_1$, measure a second sample $[T_{PIO1}]_2$ of the magnitude and the phase of the fundamental harmonic $T_{PIO1}$ of the output signal $T_{PIO}$ of the PI compensator 230 with the feedforward gain parameter $G_F$ set to a second gain value $[G_F]_2$ different from the first gain value $[G_F]_1$, and determine the feedforward gain parameter $G_F$ (e.g., $[G_F]_3$) and the feedforward phase parameter $\theta_{T\,Cos}$ used to generate the feedforward compensation signal $T_{FF}$ based on the first sample $[T_{PIO1}]_1$ and the second sample $[T_{PIO1}]_2$. During initialization, the first gain value $[G_F]_1$ may be set to zero and the second gain value $[G_F]_2$ may be set to a non-zero value. Moreover, the load torque ripple compensator 232 may be configured to determine the feedforward gain parameter $G_F$ and the feedforward phase parameter $\theta_{T\,Cos}$ based on a difference between the first gain value $[G_F]_1$ and the second gain value $[G_F]_2$ (see e.g., Equation 10).

Moreover, the load torque ripple compensator 232 may be configured to determine the feedforward gain parameter $G_F$ and the feedforward phase parameter $\theta_{T\,Cos}$ based on a ratio of the first sample $[T_{PIO1}]_1$ and a difference between the first sample $[T_{PIO1}]_1$ and the second sample $[T_{PIO1}]_2$.

In order to trigger an adjustment to the feedforward compensation signal $T_{FF}$, the load torque ripple compensator 232 may be configured to measure a first sample of a magnitude and a phase of a fundamental harmonic $T_{PIO1}$ of the output signal Trio of the PI compensator 230, compare the magnitude of the first sample to a threshold value $T_\varepsilon$, and trigger the update to the feedforward compensation signal $T_{FF}$ based on the magnitude of the first sample being greater than or equal to or greater than threshold value $T_\varepsilon$. The load torque ripple compensator 232 may be is configured to, while performing the update to the feedforward compensation signal $T_{FF}$, measure a second sample of the magnitude and the phase of the fundamental harmonic $T_{PIO1}$ of the output signal $T_{PIO}$ of the PI compensator 230 with the feedforward gain parameter $G_F$ having an adjusted gain value compared to a gain value used during a measurement of the first sample, and determine the feedforward gain parameter $G_F$ (e.g., $[G_F]_3$) and the feedforward phase parameter $\theta_{T\,Cos}$ used to update the feedforward compensation signal $T_{FF}$ based on the first sample and the second sample.

Thus, the load torque ripple compensator 232 may be configured to generate a first feedforward compensation signal $[T_{FF}]_1$, and measure a first sample $[T_{PIO1}]_1$ of a fundamental harmonic of the output signal $T_{PIO}$ of the PI compensator 230 while the first feedforward compensation signal $[T_{FF}]_1$ is added to the output signal $T_{PIO}$ of the PI compensator 230 for generating a first torque reference value $T_{Ref}$. The load torque ripple compensator 232 may be configured to generate a second feedforward compensation signal $[T_{FF}]_2$, and measure a second sample $[T_{PIO1}]_2$ of a fundamental harmonic of the output signal $T_{PIO}$ of the PI compensator 230 while the second feedforward compensation signal $[T_{FF}]_2$ is added to the output signal $T_{PIO}$ of the PI compensator 230 for generating a second torque reference value $T_{Ref}$. The first feedforward compensation signal $[T_{FF}]_1$ and the second feedforward compensation signal $[T_{FF}]_1$ are different due to, for example, different gain values $[G_F]_1$ and $[G_F]_2$. The load torque ripple compensator 232 may be configured to determine the feedforward gain parameter $G_F$ and the feedforward phase parameter $\theta_{T\,Cos}$ used to generate the feedforward compensation signal $T_{FF}$ based on the first sample $[T_{PIO1}]_1$ and the second sample $[T_{PIO1}]_2$, as described above. Thus, the first feedforward compensation signal $[T_{FF}]_1$ and the second feedforward compensation signal $[T_{FF}]_2$ may correspond to different feedforward gain parameters (e.g., different gain values $[G_F]_1$ and $[G_F]_2$).

As indicated above, FIG. 10 is provided merely as an example. Other examples may differ from what is described with regard to FIG. 10. The number and arrangement of components shown in FIG. 10 are provided as an example.

In practice, the system model 1000 may include additional components, fewer components, different components, or differently arranged components than those shown in FIG. 10. Two or more components shown in FIG. 10 may be implemented within a single component, or a single component shown in FIG. 10 may be implemented as multiple, distributed components. Additionally, or alternatively, a set of components (e.g., one or more components) of the system model 1000 may perform one or more functions described as being performed by another set of components of the system model 1000.

Figure 11:
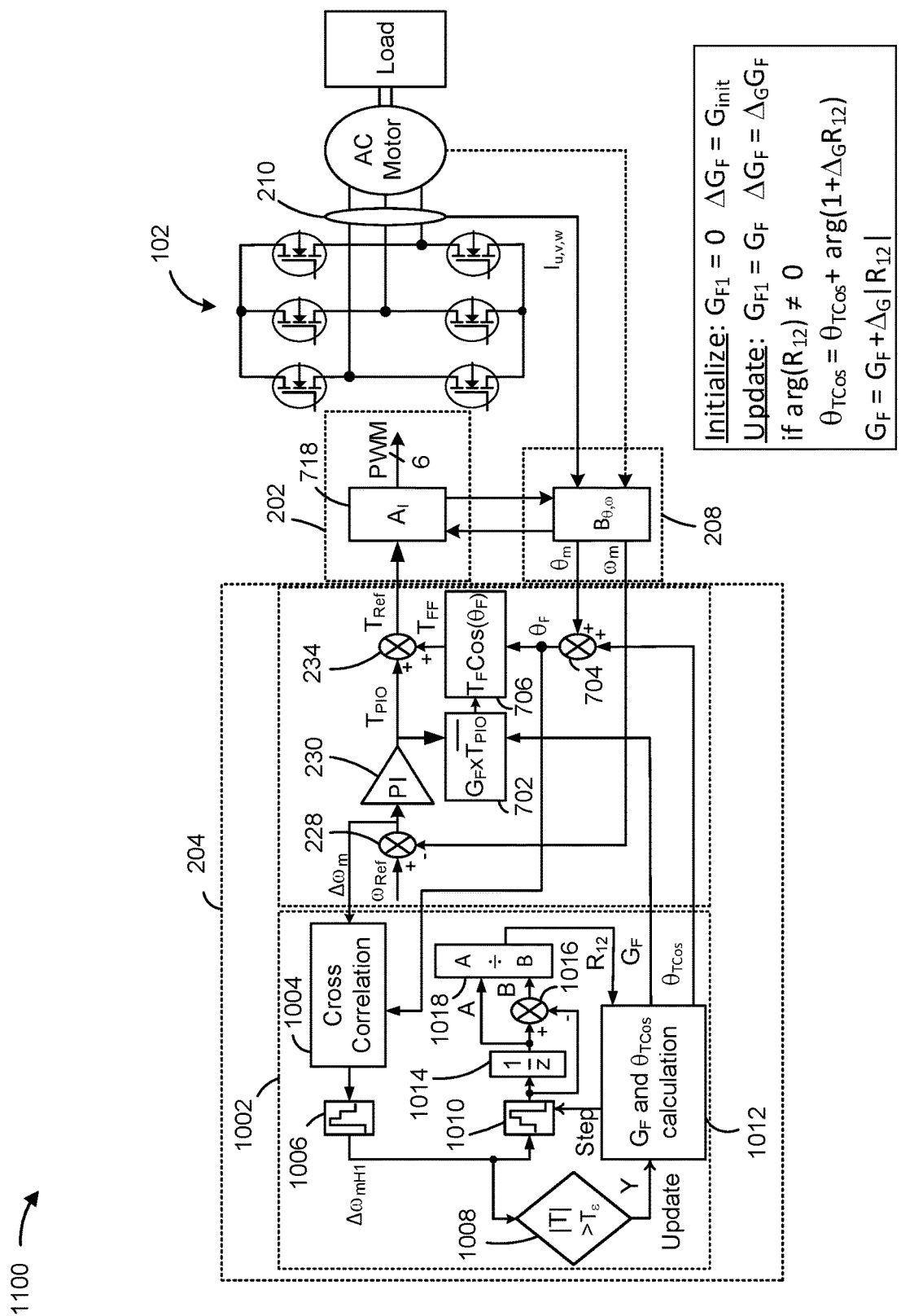
FIG. 11 illustrates a system model of a motor control algorithm with automated adjustment of torque compensation according to one or more implementations.

FIG. 11 illustrates a system model 1100 of a motor control algorithm with automated adjustment of torque compensation according to one or more implementations. The system model 1100 is similar to the system model 1000 described in connection with FIG. 10, with the exception that the cross-correlation block 1004 receives the speed error signal Δωm instead of the output signal output signal $T_{PIO}$ of the PI compensator 230. Thus, the cross-correlation block 1004 may extract a complex vector representing the speed error signal Δωm that represents a magnitude and a phase of a fundamental harmonic component $\Delta\omega_{mH1}$ of the speed error signal Δωm to be used as a first sample $[\Delta\omega_{mH1}]_1$ and a second sample $[\Delta\omega_{mH1}]_2$. The magnitude and the phase of the fundamental harmonic component $\Delta\omega_{mH1}$ of the speed error signal Δωm, for the first sample $[\Delta\omega_{mH1}]_1$ and the second sample $[\Delta\omega_{mH1}]_2$, are processed in a similar manner by the cross-correlation unit 1002 described above relative to the magnitude and the phase of the fundamental harmonic component of the output signal $T_{PIO}$. For example, the cross-correlation unit 1002 may be configured to measure a magnitude and a phase of a fundamental harmonic of the speed error signal Δωm and determine the feedforward gain parameter $G_F$ and the feedforward phase parameter $\theta_{T\,Cos}$ based on the magnitude and the phase of the fundamental harmonic of the speed error signal Δωm. Equation 11 provides a ratio $R_{12}$ of the first sample $[\Delta\omega_{mH1}]_1$ of the fundamental harmonic component of the speed error signal Δωm and the difference between the first and the second samples $([\Delta\omega_{mH1}]_1-[\Delta\omega_{mH1}]_2)$ of the fundamental harmonic component speed error signal Δωm.

$$R_{12} = \frac{[\Delta\omega_{mH1}]_1}{[\Delta\omega_{mH1}]_1 - [\Delta\omega_{mH1}]_2} = \frac{T_{CH1} - [T_{FF}]_1}{([T_{FF}]_2 - [T_{FF}]_1)}. \quad \text{Eq. 11}$$

The main algorithm block 1012 may be configured to calculate updated values for the feedforward gain parameter $G_F$ and the feedforward phase parameter $\theta_{T\,Cos}$ from Equations 9 and/or 10 using the ratio $R_{12}$. The main algorithm block 1012 may provide the updated values for the feedforward gain parameter $G_F$ and the feedforward phase parameter $\theta_{T\,Cos}$ to the gain function 702 and the summing junction 704, respectively, in order to update the feedforward compensation signal $T_{FF}$ that is to be used for compensating for the load torque ripple Tc.

As indicated above, FIG. 11 is provided merely as an example. Other examples may differ from what is described with regard to FIG. 11. The number and arrangement of components shown in FIG. 11 are provided as an example. In practice, the system model 1100 may include additional components, fewer components, different components, or differently arranged components than those shown in FIG. 11. Two or more components shown in FIG. 11 may be implemented within a single component, or a single component shown in FIG. 11 may be implemented as multiple, distributed components. Additionally, or alternatively, a set of components (e.g., one or more components) of the system model 1100 may perform one or more functions described as being performed by another set of components of the system model 1100.

The following provides an overview of some Aspects of the present disclosure:

Aspect 1: A motor controller configured to drive a motor coupled to a shaft, the motor controller comprising: a measurement interface configured to measure a mechanical angle of the shaft and a rotational speed of the shaft, and generate a speed feedback signal representative of the rotational speed; a speed regulator comprising: a first error component configured to receive a speed reference signal corresponding to a speed reference value and the speed feedback signal, and generate a speed error signal based on a difference between the speed reference signal and the speed feedback signal; a proportional integral (PI) controller configured to, based on the speed error signal, regulate a torque reference value that is configured to sustain the speed reference value; and a load torque ripple compensator configured to apply a torque feedforward function to reduce a load torque ripple in the torque reference value, wherein applying the torque feedforward function includes generating a feedforward compensation signal that matches a frequency, a magnitude, and a phase of the load torque ripple, and adding the feedforward compensation signal to an output signal of the PI controller to generate the torque reference value, wherein the load torque ripple varies with the mechanical angle, and wherein the load torque ripple compensator is configured to dynamically adjust a magnitude and a phase of the feedforward compensation signal in real time as a load of the motor varies over time; and a current regulator configured to receive the torque reference value and drive motor currents of the motor for generating a torque corresponding to the torque reference value.

Aspect 2: The motor controller of Aspect 1, wherein the torque feedforward function includes a feedforward gain parameter and a feedforward phase parameter used as inputs for generating the feedforward compensation signal, wherein the load torque ripple compensator is configured to measure at least one harmonic component of the output signal of the PI controller and determine at least one of the feedforward gain parameter and the feedforward phase parameter based on the at least one harmonic component of the output signal of the PI controller.

Aspect 3: The motor controller of Aspect 2, wherein the load torque ripple compensator is configured to multiply the feedforward gain parameter with an average of the output signal of the PI controller to determine the magnitude of the feedforward compensation signal.

Aspect 4: The motor controller of Aspect 3, wherein the magnitude of the feedforward compensation signal increases with increasing load.

Aspect 5: The motor controller of Aspect 2, wherein the load torque ripple compensator is configured to add the feedforward phase parameter to the mechanical angle to determine the phase of the feedforward compensation signal.

Aspect 6: The motor controller of Aspect 2, wherein the load torque ripple compensator is configured to measure a first sample of a magnitude and a phase of a fundamental harmonic of the output signal of the PI controller with the feedforward gain parameter set to a first gain value, measure a second sample of the magnitude and the phase of the fundamental harmonic of the output signal of the PI controller with the feedforward gain parameter set to a second gain value different from the first gain value, and determine the feedforward gain parameter and the feedforward phase parameter used to generate the feedforward compensation signal based on the first sample and the second sample.

Aspect 7: The motor controller of Aspect 6, wherein the first gain value is zero.

Aspect 8: The motor controller of Aspect 6, wherein the load torque ripple compensator is configured to determine the feedforward gain parameter and feedforward phase parameter based on a difference between the first gain value and the second gain value.

Aspect 9: The motor controller of Aspect 6, wherein the load torque ripple compensator is configured to determine the feedforward gain parameter and the feedforward phase parameter based on a ratio of the first sample and a difference between the first sample and the second sample.

Aspect 10: The motor controller of Aspect 2, wherein the load torque ripple compensator is configured to measure a first sample of a magnitude of a fundamental harmonic of the output signal of the PI controller, compare the magnitude of the first sample to a threshold, and trigger an update to the feedforward compensation signal based on the magnitude of the first sample being greater than or equal to or greater than the threshold.

Aspect 11: The motor controller of Aspect 10, wherein the load torque ripple compensator is configured to, while performing the update to the feedforward compensation signal, measure a second sample of the magnitude and the phase of the fundamental harmonic of the output signal of the PI controller with the feedforward gain parameter having an adjusted value compared to a value used during a measurement of the first sample, and determine the feedforward gain parameter and the feedforward phase parameter used to update the feedforward compensation signal based on the first sample and the second sample.

Aspect 12: The motor controller of Aspect 2, wherein the load torque ripple compensator is configured to generate a first feedforward compensation signal, and measure a first sample of a fundamental harmonic of the output signal of the PI controller while the first feedforward compensation signal is added to the output signal of the PI controller for generating a first torque reference value, wherein the load torque ripple compensator is configured to generate a second feedforward compensation signal, and measure a second sample of the fundamental harmonic of the output signal of the PI controller while the second feedforward compensation signal is added to the output signal of the PI controller for generating a second torque reference value, wherein the first feedforward compensation signal and the second feedforward compensation signal are different, and wherein the load torque ripple compensator is configured to determine the feedforward gain parameter and the feedforward phase parameter used to generate the feedforward compensation signal based on the first sample and the second sample.

Aspect 13: The motor controller of Aspect 12, wherein the first feedforward compensation signal and the second feedforward compensation signal correspond to different feedforward gain parameters.

Aspect 14: The motor controller of any of Aspects 1-13, wherein the PI controller regulates the torque reference value to drive an average of the speed error signal to zero.

Aspect 15: The motor controller of any of Aspects 1-14, wherein the motor controller is configured to drive a compressor load coupled to the motor via the shaft.

Aspect 16: The motor controller of any of Aspects 1-15, wherein the speed feedback signal includes an AC error component corresponding to the load torque ripple.

Aspect 17: The motor controller of any of Aspects 1-16, wherein the torque feedforward function includes a feedforward gain parameter and a feedforward phase parameter used as inputs for generating the feedforward compensation signal, wherein the load torque ripple compensator is configured to measure a magnitude and a phase of a fundamental harmonic of the speed error signal and determine at least one of the feedforward gain parameter and the feedforward phase parameter based on the magnitude and the phase of the fundamental harmonic of the speed error signal.

Aspect 18: The motor controller of any of Aspects 1-17, wherein the load varies non-linearly with a change in the mechanical angle of the shaft.

Aspect 19: A method of reducing load torque ripple associated with driving a motor coupled to a shaft, the method comprising: measuring a mechanical angle of the shaft; measuring a rotational speed of the shaft; generating a speed feedback signal representative of the rotational speed; generate a speed error signal based on a difference between a speed reference signal and the speed feedback signal; regulating, by a proportional integral (PI) controller based on the speed error signal, a torque reference value that is configured to sustain a speed reference value of the speed reference signal; applying a torque feedforward function to reduce a load torque ripple in the torque reference value, including generating a feedforward compensation signal that matches a frequency, a magnitude, and a phase of the load torque ripple, and adding the feedforward compensation signal to an output signal of the PI controller to generate the torque reference value, wherein the load torque ripple varies with the mechanical angle; dynamically adjusting a magnitude and a phase of the feedforward compensation signal in real time as a load of the motor varies over time; and driving motor currents of the motor for generating a torque corresponding to the torque reference value.

Aspect 20: The method of Aspect 19, wherein the torque feedforward function includes a feedforward gain parameter and a feedforward phase parameter used as inputs for generating the feedforward compensation signal, wherein the method further comprises: measuring at least one harmonic component of the output signal of the PI controller; and determining at least one of the feedforward gain parameter and the feedforward phase parameter based on the at least one harmonic component of the output signal of the PI controller.

Aspect 21: The method of Aspect 20, further comprising: measuring a first sample of a fundamental harmonic of the output signal of the PI controller with the feedforward gain parameter set to a first gain value; measuring a second sample of the fundamental harmonic of the output signal of the PI controller with the feedforward gain parameter set to a second gain value different from the first gain value; and determining the feedforward gain parameter and the feedforward phase parameter used to generate the feedforward compensation signal based on the first sample and the second sample.

Aspect 22: The method of Aspect 20, further comprising: measuring a first sample of a fundamental harmonic of the output signal of the PI controller; comparing the first sample to a threshold; and triggering an update to the feedforward compensation signal based on the first sample satisfying the threshold.

Aspect 23: The method of any of Aspects 19-22, wherein the torque feedforward function includes a feedforward gain parameter and a feedforward phase parameter used as inputs for generating the feedforward compensation signal, wherein the method further comprises: measuring a fundamental harmonic of the speed error signal; and determining at least one of the feedforward gain parameter and the feedforward phase parameter based on the fundamental harmonic of the speed error signal.

Aspect 24: A system configured to perform one or more operations recited in one or more of Aspects 1-23.

Aspect 25: An apparatus comprising means for performing one or more operations recited in one or more of Aspects 1-23.

Aspect 26: A non-transitory computer-readable medium storing a set of instructions, the set of instructions comprising one or more instructions that, when executed by a device, cause the device to perform one or more operations recited in one or more of Aspects 1-23.

Aspect 27: A computer program product comprising instructions or code for executing one or more operations recited in one or more of Aspects 1-23.

The foregoing disclosure provides illustration and description, but is not intended to be exhaustive or to limit the implementations to the precise form disclosed. Modifications and variations may be made in light of the above disclosure or may be acquired from practice of the implementations.

Some implementations may be described herein in connection with thresholds. As used herein, "satisfying" a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As used herein, the term "component" is intended to be broadly construed as hardware, firmware, or a combination of hardware and software. Systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein, refers to any of the foregoing structures or any other structure suitable for implementation of the techniques described herein. Software may be stored on a non-transitory computer-readable medium such that the non-transitory computer readable medium includes program code or a program algorithm stored thereon that, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal, further information. "Signal conditioning," as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation, and any other processes required to make a signal suitable for processing after conditioning.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a and b, a and c, b and c, and a, b, and c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A motor controller configured to drive a motor coupled to a shaft, the motor controller comprising:
   a measurement interface configured to measure a mechanical angle of the shaft and a rotational speed of the shaft, and generate a speed feedback signal representative of the rotational speed;
   a speed regulator comprising:
      a first error component configured to receive a speed reference signal corresponding to a speed reference value and the speed feedback signal, and generate a speed error signal based on a difference between the speed reference signal and the speed feedback signal;
      a proportional integral (PI) controller configured to, based on the speed error signal, regulate a torque reference value that is configured to sustain the speed reference value; and
      a load torque ripple compensator configured to apply a torque feedforward function to reduce a load torque ripple in the torque reference value, wherein applying the torque feedforward function includes generating a feedforward compensation signal that matches a frequency, a magnitude, and a phase of the load torque ripple, and adding the feedforward compensation signal to an output signal of the PI controller to generate the torque reference value,
         wherein the load torque ripple varies with the mechanical angle, and
         wherein the load torque ripple compensator is configured to dynamically adjust a magnitude and a phase of the feedforward compensation signal in real time as a load of the motor varies over time; and
   a current regulator configured to receive the torque reference value and drive motor currents of the motor for generating a torque corresponding to the torque reference value.

2. The motor controller of claim 1, wherein the torque feedforward function includes a feedforward gain parameter and a feedforward phase parameter used as inputs for generating the feedforward compensation signal,
   wherein the load torque ripple compensator is configured to measure at least one harmonic component of the output signal of the PI controller and determine at least one of the feedforward gain parameter and the feedforward phase parameter based on the at least one harmonic component of the output signal of the PI controller.

3. The motor controller of claim 2, wherein the load torque ripple compensator is configured to multiply the feedforward gain parameter with an average of the output signal of the PI controller to determine the magnitude of the feedforward compensation signal.

4. The motor controller of claim 3, wherein the magnitude of the feedforward compensation signal increases with increasing load.

5. The motor controller of claim 2, wherein the load torque ripple compensator is configured to add the feedforward phase parameter to the mechanical angle to determine the phase of the feedforward compensation signal.

6. The motor controller of claim 2, wherein the load torque ripple compensator is configured to measure a first sample of a magnitude and a phase of a fundamental harmonic of the output signal of the PI controller with the feedforward gain parameter set to a first gain value, measure a second sample of the magnitude and the phase of the fundamental harmonic of the output signal of the PI controller with the feedforward gain parameter set to a second gain value different from the first gain value, and determine the feedforward gain parameter and the feedforward phase parameter used to generate the feedforward compensation signal based on the first sample and the second sample.

7. The motor controller of claim 6, wherein the first gain value is zero.

8. The motor controller of claim 6, wherein the load torque ripple compensator is configured to determine the feedforward gain parameter and feedforward phase parameter based on a difference between the first gain value and the second gain value.

9. The motor controller of claim 6, wherein the load torque ripple compensator is configured to determine the feedforward gain parameter and the feedforward phase parameter based on a ratio of the first sample and a difference between the first sample and the second sample.

10. The motor controller of claim 2, wherein the load torque ripple compensator is configured to measure a first sample of a magnitude of a fundamental harmonic of the output signal of the PI controller, compare the magnitude of the first sample to a threshold, and trigger an update to the feedforward compensation signal based on the magnitude of the first sample being greater than or equal to or greater than the threshold.

11. The motor controller of claim 10, wherein the load torque ripple compensator is configured to, while performing the update to the feedforward compensation signal, measure a second sample of the magnitude and the phase of the fundamental harmonic of the output signal of the PI controller with the feedforward gain parameter having an adjusted value compared to a value used during a measurement of the first sample, and determine the feedforward gain parameter and the feedforward phase parameter used to update the feedforward compensation signal based on the first sample and the second sample.

12. The motor controller of claim 2, wherein the load torque ripple compensator is configured to generate a first feedforward compensation signal, and measure a first sample of a fundamental harmonic of the output signal of the PI controller while the first feedforward compensation signal is added to the output signal of the PI controller for generating a first torque reference value, wherein the load torque ripple compensator is configured to generate a second feedforward compensation signal, and measure a second sample of the fundamental harmonic of the output signal of the PI controller while the second feedforward compensation signal is added to the output signal of the PI controller for generating a second torque reference value, wherein the first feedforward compensation signal and the second feedforward compensation signal are different, and wherein the load torque ripple compensator is configured to determine the feedforward gain parameter and the feedforward phase parameter used to generate the feedforward compensation signal based on the first sample and the second sample.

13. The motor controller of claim 12, wherein the first feedforward compensation signal and the second feedforward compensation signal correspond to different feedforward gain parameters.

14. The motor controller of claim 1, wherein the PI controller regulates the torque reference value to drive an average of the speed error signal to zero.

15. The motor controller of claim 1, wherein the motor controller is configured to drive a compressor load coupled to the motor via the shaft.

16. The motor controller of claim 1, wherein the speed feedback signal includes an AC error component corresponding to the load torque ripple.

17. The motor controller of claim 1, wherein the torque feedforward function includes a feedforward gain parameter and a feedforward phase parameter used as inputs for generating the feedforward compensation signal, wherein the load torque ripple compensator is configured to measure a magnitude and a phase of a fundamental harmonic of the speed error signal and determine at least one of the feedforward gain parameter and the feedforward phase parameter based on the magnitude and the phase of the fundamental harmonic of the speed error signal.

18. The motor controller of claim 1, wherein the load varies non-linearly with a change in the mechanical angle of the shaft.

19. A method of reducing load torque ripple associated with driving a motor coupled to a shaft, the method comprising:
measuring a mechanical angle of the shaft;
measuring a rotational speed of the shaft;
generating a speed feedback signal representative of the rotational speed;
generate a speed error signal based on a difference between a speed reference signal and the speed feedback signal;
regulating, by a proportional integral (PI) controller based on the speed error signal, a torque reference value that is configured to sustain a speed reference value of the speed reference signal;

applying a torque feedforward function to reduce a load torque ripple in the torque reference value, including generating a feedforward compensation signal that matches a frequency, a magnitude, and a phase of the load torque ripple, and adding the feedforward compensation signal to an output signal of the PI controller to generate the torque reference value, wherein the load torque ripple varies with the mechanical angle;
dynamically adjusting a magnitude and a phase of the feedforward compensation signal in real time as a load of the motor varies over time; and
driving motor currents of the motor for generating a torque corresponding to the torque reference value.

20. The method of claim 19, wherein the torque feedforward function includes a feedforward gain parameter and a feedforward phase parameter used as inputs for generating the feedforward compensation signal, wherein the method further comprises:
measuring at least one harmonic component of the output signal of the PI controller; and
determining at least one of the feedforward gain parameter and the feedforward phase parameter based on the at least one harmonic component of the output signal of the PI controller.

21. The method of claim 20, further comprising:
measuring a first sample of a fundamental harmonic of the output signal of the PI controller with the feedforward gain parameter set to a first gain value;
measuring a second sample of the fundamental harmonic of the output signal of the PI controller with the feedforward gain parameter set to a second gain value different from the first gain value; and
determining the feedforward gain parameter and the feedforward phase parameter used to generate the feedforward compensation signal based on the first sample and the second sample.

22. The method of claim 20, further comprising:
measuring a first sample of a fundamental harmonic of the output signal of the PI controller;
comparing the first sample to a threshold; and
triggering an update to the feedforward compensation signal based on the first sample satisfying the threshold.

23. The method of claim 19, wherein the torque feedforward function includes a feedforward gain parameter and a feedforward phase parameter used as inputs for generating the feedforward compensation signal, wherein the method further comprises:
measuring a fundamental harmonic of the speed error signal; and
determining at least one of the feedforward gain parameter and the feedforward phase parameter based on the fundamental harmonic of the speed error signal.

* * * * *